(12) United States Patent
Gorshe

(10) Patent No.: US 8,340,134 B1
(45) Date of Patent: Dec. 25, 2012

(54) METHOD AND SYSTEM FOR CONTROLLING COUNT INFORMATION IN GENERIC MAPPING PROCEDURE

(75) Inventor: Steven Scott Gorshe, Beaverton, OR (US)

(73) Assignee: PMC-Sierra, Inc., Santa Clara, CA (US)

(*) Notice: Subject to any disclaimer, the term of this patent is extended or adjusted under 35 U.S.C. 154(b) by 369 days.

(21) Appl. No.: 12/612,397

(22) Filed: Nov. 4, 2009

(51) Int. Cl.
*H04J 3/00* (2006.01)

(52) U.S. Cl. ..... 370/476; 370/389; 370/394; 370/395.5; 370/465; 370/470; 370/471; 370/472; 370/473; 370/474; 370/475; 370/503; 370/504; 370/505; 370/506; 370/537; 370/907; 398/43; 398/45

(58) Field of Classification Search ............... None
See application file for complete search history.

(56) References Cited

U.S. PATENT DOCUMENTS

| | | | | |
|---|---|---|---|---|
| 7,298,694 | B2* | 11/2007 | Kamiya et al. | 370/218 |
| 7,573,871 | B2* | 8/2009 | Lahav et al. | 370/389 |
| 7,894,482 | B1* | 2/2011 | Wu et al. | 370/476 |
| 7,978,712 | B2* | 7/2011 | Dong et al. | 370/395.5 |
| 2007/0104485 | A1* | 5/2007 | Zhang | 398/69 |

FOREIGN PATENT DOCUMENTS

CN 200910106028 * 3/2009

OTHER PUBLICATIONS

Vissers, G.709 Living List (Jun. 11, 2006), 9 pages.
Synchronous Optical Network (SONET)—Basic Description including Multiplex Structure, Rates, and Formats, American National Standard, Alliance for Telecommunications Industry Solutions, prepared by T1x1.5 Working Group on Optical Hierarchical Interfaces (May 17, 2001),107 pages, Washington, D.C.
Helvoort, et al., Considerations on Bit Rate Agnostic Mapping Standardization, Oct. 15-19, 2007, 6 pages, Shenzhen, China.
Trowbridge, Bit-Rate Agnostic Mapping for Recommendation G.709, Oct. 15-19, 2007, 8 pages, Shenzhen, China.
Ma, et al., WD40-NG OTN—Muxing Structure OTU-4, Sep. 22-26, 2008, 8 pages, Cheju, Korea.

* cited by examiner

*Primary Examiner* — John Blanton
*Assistant Examiner* — Aixa A Guadalupe Cruz
(74) *Attorney, Agent, or Firm* — Dennis R. Haszko

(57) ABSTRACT

A method of communicating count value information in an Optical Transport Network (OTN) signal frame. The method comprises determining a count value indicating a number of payload bytes to be sent in a next OTN signal frame; determining that a change in the count value ($\Delta$) with respect to a current count value is within a predetermined range; selecting an inversion pattern indicating the change in the count value; determining a cyclic redundancy check (CRC) code associated with the inversion pattern; and, inserting the inversion pattern and the CRC code in a Generic Mapping Procedure (GMP) overhead of the OTN signal frame.

15 Claims, 15 Drawing Sheets

METHOD AND SYSTEM FOR CONTROLLING COUNT INFORMATION IN GENERIC MAPPING PROCEDURE

FIELD OF THE INVENTION

The present disclosure relates generally to communication networks. More particularly, the present disclosure relates to interfaces for an Optical Transport Network.

BACKGROUND OF THE INVENTION

The Optical Transport Network (OTN) defined by the International Telecommunication Standardization Sector (ITU-T) is emerging as the core technology for telecommunications transport networks. The OTN provides an optimum converged transport technology for transparently carrying important legacy and emerging client signals over WDM networks. The OTN architecture is specified in ITU-T Rec. G.872 standard and the frame format and payload mappings are specified in the G.709 standard for carrying SONET/SDH, Ethernet and Storage Area Network (SAN) signals. GMP has been adopted as the mechanism for enabling the transport of all new client signals over the OTN, including the important Ethernet, video, and storage area network (SAN) signals.

The Generic Mapping Procedure (GMP) is a method for mapping arbitrary Constant Bit-Rate (CBR) client signals into Optical Transport Network (OTN) signals as specified by the ITU-T G.709 standard. At regular intervals within the OTN signal frame structure, the GMP overhead within the OTN signal communicates a count value related to the number of client bytes that will be transmitted in the OTN signal payload area during the next interval. This interval could be one frame or one multi-frame of the OTN Optical Data Unit (ODU) signal. The GMP payload byte placement algorithm is specified such that the receiver can determine, from the count value or the count information, OTN payload area bytes that contain client data and OTN payload area bytes that contain dummy or stuff data.

SUMMARY OF THE INVENTION

In a first aspect, there is provided a method of communicating count value information in an Optical Transport Network (OTN) signal frame. The method comprises determining a count value indicating a number of payload bytes to be sent in a next OTN signal frame; determining that a change in the count value ($\Delta$) with respect to a current count value is within a predetermined range; selecting an inversion pattern indicating the change in the count value; determining a cyclic redundancy check (CRC) code associated with the inversion pattern; and, inserting the inversion pattern and the CRC code into a Generic Mapping Procedure (GMP) overhead of the OTN signal frame.

In an embodiment, the inversion pattern includes an increment/decrement indication. The inversion pattern is applied to bits indicating the count value and the CRC code is associated with the count value modified by the inversion pattern.

In an embodiment, the increment/decrement indication includes a single bit increment indicator and a single bit decrement indicator and the predetermined range is defined by $-2 \leq \Delta \leq +2$.

In an embodiment, a first portion of the inversion pattern is inserted in a JC1 byte of the GMP overhead of the OTN signal frame; a second portion of the inversion pattern is inserted in a JC2 byte of the GMP overhead of the OTN signal frame; and, the CRC code is inserted in a JC3 byte of the GMP overhead of the OTN signal frame.

The first portion of the inversion pattern in the JC1 byte of the GMP overhead of the OTN signal frame can be identical to the second portion of the inversion pattern in the JC2 byte of the GMP overhead of the OTN signal frame. The single bit increment indicator and the single bit decrement indicator can be in the JC2 byte of the GMP overhead of the OTN signal frame. The single bit increment indicator and the single bit decrement indicator in the JC2 byte of the GMP overhead of the OTN signal can be set in an identical manner to corresponding inversion pattern bits in the JC1 byte of the GMP overhead of the OTN signal frame.

In a further embodiment, the increment/decrement indication includes a single bit increment/decrement indicator and the predetermined range is defined by $-1 \leq \Delta \leq +1$.

In another embodiment, a first portion of the inversion pattern is inserted in a JC1 byte of the GMP overhead of the OTN signal frame; a second portion of the inversion pattern is inserted in a JC2 byte of the GMP overhead of the OTN signal frame; a third portion of the inversion pattern is inserted in a JC3 byte of the GMP overhead of the OTN signal frame; and, the CRC code is inserted in a JC4 byte of the GMP overhead of the OTN signal frame. The single bit increment/decrement indicator can be in the JC3 byte of the GMP overhead of the OTN signal frame.

In an embodiment, the method further comprises: upon determining that the change in the count value with respect to the current count value is not within the predetermined range, indicating the number of payload bytes to be sent in the next OTN signal frame in the GMP overhead.

In an aspect, there is provided a method of determining count value information from an encoded Generic Mapping Procedure (GMP) overhead of an Optical Transport Network (OTN) signal frame. The method of determining the count value information comprises: analyzing the increment/decrement indication in the inversion pattern of the GMP overhead of the OTN signal frame to determine that the inversion pattern is valid; and, comparing an inversion status of a preselected portion of the inversion pattern to determine the change in the count value indicated by the inversion pattern in the GMP overhead of the OTN signal frame.

In an embodiment, the method further comprises validating the cyclic redundancy check (CRC) code in the GMP overhead of the OTN signal frame. The CRC code can be used to correct single bit errors in the GMP overhead of the OTN signal frame prior to comparing the inversion status.

In an embodiment, comparing the inversion status of a preselected portion of the inversion pattern comprises: determining that the single bit increment indicator is inverted; and comparing the inverted single bit increment indicator and a single bit in the preselected portion of the inversion pattern to determine that the change in the count value indicated by the inversion pattern in the GMP overhead of the OTN signal frame is an increment in the current count value by a predetermined value.

In an other embodiment, comparing the inversion status of a preselected portion of the inversion pattern comprises: determining that the single bit decrement indicator is inverted; and comparing the inverted single bit decrement indicator and a single bit in the preselected portion of the inversion pattern to determine that the change in the count value indicated by the inversion pattern in the GMP overhead of the OTN signal frame is a decrement in the current count value by a predetermined value.

In an aspect, there is provided a method of determining count value information from an encoded Generic Mapping Procedure (GMP) overhead of an Optical Transport Network (OTN) signal frame. The method of determining the count value information comprises: analyzing the inversion status of the single bit increment indicator and the single bit decrement indicator to determine that the change in the count value indicated by the inversion pattern in the GMP overhead of the OTN signal frame is within the predetermined range; analyzing the inversion status of the first portion of the inversion pattern in the JC1 byte of the GMP overhead of the OTN signal frame to validate the first portion of the inversion pattern; analyzing the inversion status of the second portion of the inversion pattern in the JC2 byte of the GMP overhead of the OTN signal frame to validate the second portion of the inversion pattern; comparing the validated first portion of the inversion pattern and the validated second portion of the inversion pattern to determine the change in the count value indicated by the inversion pattern in the GMP overhead of the OTN signal frame.

The change in the count value indicated by the inversion pattern in the GMP overhead of the OTN signal frame can be determined by the first portion of the inversion pattern in the JC1 byte when the second portion of the inversion pattern in the JC2 byte is determined to be invalid.

The change in the count value indicated by the inversion pattern in the GMP overhead of the OTN signal frame can be determined by the second portion of the inversion pattern in the JC2 byte when the first portion of the inversion pattern in the JC1 byte is determined to be invalid.

In an embodiment, if the validated first portion of the inversion pattern in the JC1 byte of the GMP overhead in the OTN signal frame is different form the validated second portion of the inversion pattern in the JC2 byte of the GMP overhead of the OTN signal frame, a list of syndromes known to convert one inversion pattern to another is analyzed to determine a burst error in the JC1 byte or the JC2 byte of the GMP overhead of the OTN signal frame.

In an aspect, there is provided a method of determining count value information from an encoded Generic Mapping Procedure (GMP) overhead of an Optical Transport Network (OTN) signal frame. The method of determining the count value information comprises: determining expected CRC codes corresponding to inversion patterns indicating a change in the count value ($\Delta$) with respect to a current count value within a predetermined range; analyzing the inversion status of the first portion of the inversion pattern in the JC1 byte of the GMP overhead of the OTN signal frame to validate the first portion of the inversion pattern; upon determination that the first portion of the inversion patter is valid: comparing the CRC code in the GMP overhead of the OTN signal frame with the expected CRC codes associated with the validated first portion of the inversion pattern in the GMP overhead of the OTN signal frame to determine the change in the count value.

In an embodiment, upon determination that the first portion of the inversion patter is invalid, the inversion status of the second portion of the inversion pattern in the JC2 byte of the GMP overhead of the OTN signal frame is analyzed to validate the second portion of the inversion pattern. Upon determination that the second portion of the inversion pattern is valid, the CRC code in the GMP overhead of the OTN signal frame with the expected CRC codes associated with the validated second portion of the inversion pattern in the GMP overhead of the OTN signal frame is compared to determine the change in the count value.

In an embodiment, upon determination that the first portion of the inversion pattern and the second portion of the inversion pattern are valid, the change in the count value is determined based on the validated first portion of the inversion pattern and the validated second portion of the inversion pattern irrespective of the CRC code in the GMP overhead of the OTN signal frame.

In an aspect, there is provided a method of determining count value information from an encoded Generic Mapping Procedure (GMP) overhead of an Optical Transport Network (OTN) signal frame. The method of determining the count value information comprises: determining that a receiver of the OTN signal frame is synchronized with a transmitter of the OTN signal frame; analyzing the inversion status of the first portion of the inversion pattern in the JC1 byte of the GMP overhead of the OTN signal frame to validate the first portion of the inversion pattern; analyzing the inversion status of the second portion of the inversion pattern in the JC2 byte of the GMP overhead of the OTN signal frame to validate the second portion of the inversion pattern; analyzing the inversion status of the third portion of the inversion pattern in the JC3 byte of the GMP overhead of the OTN signal frame to validate the third portion of the inversion pattern; and, comparing any two of the validated first portion of the inversion pattern, the validated second portion of the inversion pattern, and the validated third portion of the inversion pattern to determine the change in the count value indicated by the inversion pattern in the GMP overhead of the OTN signal frame.

In an embodiment, upon determination that a synchronization between a transmitted GMP overhead of the OTN signal frame and a received GMP overhead of the OTN signal frame has been lost, a subsequently received GMP overhead of the OTN signal to validate the CRC code is analyzed. A hunt state is entered based on the increment/decrement indication and a preselected portion of the inversion pattern of the subsequently received GMP overhead of the OTN signal frame. An increment/decrement status is determined based on the hunt state and the transmitted GMP overhead of the OTN signal frame and the received GMP overhead of the OTN signal frame are synchronized.

In an embodiment, upon determination that the increment/decrement indication of the received GMP overhead of the OTN signal frame indicates a no change in the count value and upon determination that the CRC code is valid, the transmitted GMP overhead of the OTN signal frame and the received overhead of the OTN signal frame are synchronized immediately without further processing of the received GMP overhead of the OTN signal frame.

In another aspect, there is provided a system for controlling count value information in an Optical Transport Network (OTN) signal frame. The system comprises an OTN transmit node including a FIFO buffer buffering incoming client data signal, a count value determination logic measuring a rate of the incoming client data signal and a FIFO fill level to determine the number of client bytes Cn that must be transmitted during a next OTN frame, a GMP encoder selecting an inversion pattern corresponding to the Cn and calculating a CRC code associated with the selected inversion pattern, and a OTN frame construction logic assembling the OTN signal frame including an encoded GMP overhead containing the selected inversion pattern and the associated CRC code.

The system also comprises an OTN receive node including a receive buffer receiving the OTN signal frame with the encoded GMP overhead, a GMP decoder extracting the selected inversion pattern and the associated CRC code from the encoded GMP overhead, a count value interpretation logic interpreting the selected inversion pattern and the associated CRC code to ascertain the Cn sent by the transmit node, and a signal extractor extracting the client data signal from the received OTN signal frame using the ascertained Cn.

In an embodiment, the client data signal is an Ethernet, video, or a storage area network (SAN) signal.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Generally, the present invention provides a method and interfaces for an Optical Transport Network (OTN).

As described earlier, the Generic Mapping Procedure (GMP) is a method for mapping arbitrary Constant Bit-Rate (CBR) client signals into Optical Transport Network (OTN) signals as specified by the ITU-T G.709 standard. At regular intervals within the OTN signal frame structure, the GMP overhead within the OTN signal communicates a count value related to the number of client bytes that will be transmitted in the OTN signal payload area during the next interval. This interval could be one frame or one multi-frame of the OTN Optical Data Unit (ODU) signal. The GMP payload byte placement algorithm is specified such that the receiver can determine, from the count value or the count information, OTN payload area bytes that contain client data and OTN payload area bytes that contain dummy or stuff data.

Figure 1A:
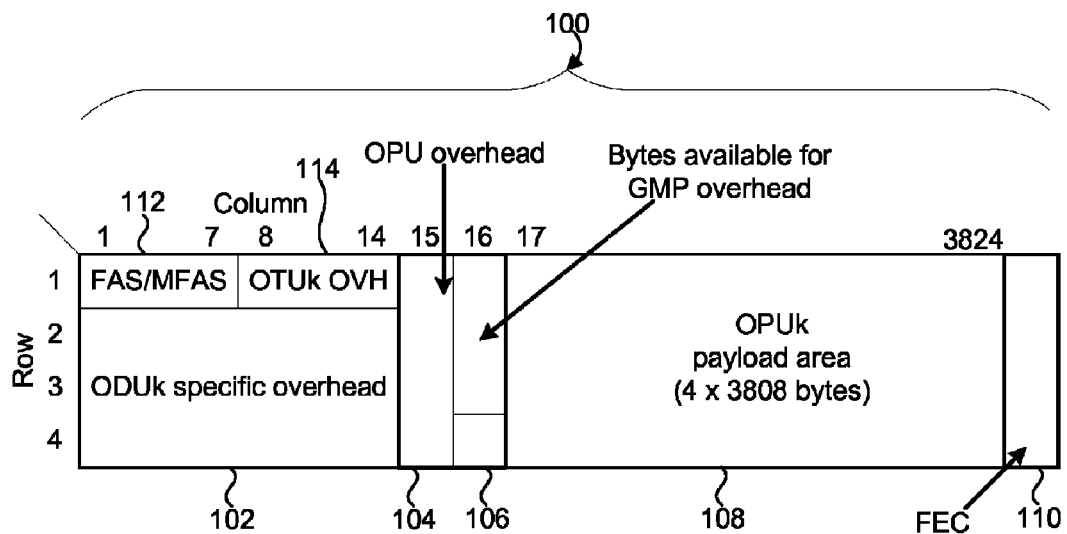
FIGS. 1A and 1B illustrate an OTN ODU frame format as specified by the ITU-T G.709 standard.
Figure 1B:
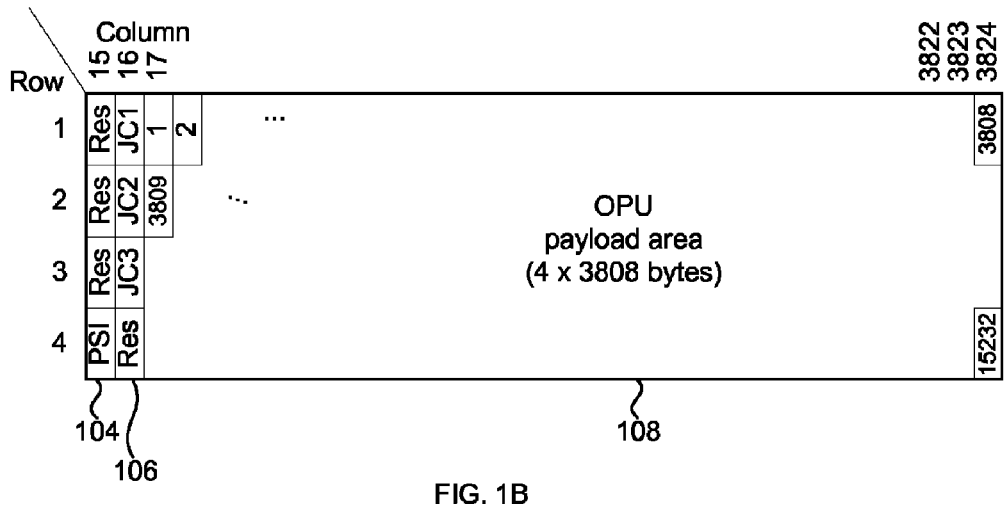

An OTN frame 100 is illustrated in FIGS. 1A and 1B, including the bytes that are potentially available for carrying GMP overhead 106 with the Optical Payload Unit (OPU) overhead. Each column of the OTN frame 100 corresponds to 8-bits of data. In other words, the OTN frame 100 contains four rows with 3824 bytes per row. In addition, forward error correction 110 may be used in the OTN frame 100 from column 3825 to column 4080. Note that the transmission order of the bytes in the ODU frame is by column per row. Specifically, frame transmission begins with row 1, column 1, followed by row 1, column 2, and so on through row 1 column 3824 (and to column 4080 if FEC is used), repeating for rows 2-4. Multiple frames can be combined to form a periodic multi-frame.

The OTN frame 100 contains an OPU overhead 104, 106 which is similar in function to the SONET/SDH Path overhead, covering the OPU from the point at which the client signal is mapped into the OPU until is extracted at the OPU termination point. The OPU overhead 104 contains indicators for the payload type (PT) and multi-frame structure (MSI). The Optical Payload Unit (OPU) payload area 108 is the payload-bearing structure within the OTN frame 100. The OPU payload area carries the client signal.

The OTN frame also includes an ODU overhead 102, which contains the overhead for path performance monitoring (PM), fault type and fault location (FTFL), two generic communications channels (GCC), an automatic protection switching and protection communications channel (APS/PCC), six levels of tandem connection monitoring (TCM), and a set of bytes reserved for experimental purposes.

The Optical Transport Unit (OTU) Overheads 112 and 114 of the OTN frame 100 contain frame alignment pattern and the multi-frame alignment signal (MFAS) 112, and GCC and selection monitoring (SM) information 114 for the OTU.

The bytes universally available for the GMP application are those of column 16. As indicated in the FIGS. 1A and 1B, it is preferable to only use the column 16 bytes in rows 1-3 of the GMP overhead 106 so that the byte in the fourth row can be reserved for future applications. However, the fourth row could also be used if necessary. A GMP receiver can then be designed with a range of robustness/complexity tradeoffs such that the receiver is optimized for the expected performance of a given OTN link application. For example, an OTN link within a network element may only require robustness to single bit errors rather than the burst errors that could occur on a long optical link.

One of the earliest proposals for encoding and controlling the count value information, as captured in the G.709 Living list, was to encode three copies of a 14-bit value for the count. At the receiver end, a majority vote of the copies was performed to determine count value information. Another option was to use FEC to cover a single copy of the count field. The two proposals suffered from a lack of sufficient overhead bits, the complexity of the majority vote, and a significant number of FEC check bits (>10 to cover a 14-bit data field against all burst errors) and the complexity in the FEC decoder required. For example, three copies of 14-bit count value requires 42 overhead bits or 14 bits/row, when in practice, only 8 bits/row are generally available.

Another method proposed for encoding and controlling count value information was to adapt a technique from SONET/SDH overhead. The SONET/SDH overhead contains a pointer field to indicate the offset of the start of path overhead in the payload envelope (container) relative to the start of the transport frame. Specifically, the pointer contains the byte number within the payload envelope where the first byte of the path overhead is located. The odd bits of the pointer value are inverted to indicate an increment by one of the pointer value, and the even bits are inverted to indicate a decrement by one of the pointer value. Four bits form a "new data flag" to indicate a completely new pointer value. However, this method requires persistency checking for any change in the count value information. Specifically, there must be at least three frames between any new increment, decrement, or new data indication so that the receiver can perform a majority vote over the overhead in those frames to determine the correct base pointer value.

Yet another method proposed for encoding and controlling count value information was to use a 22-bit count value to cover the largest possible concatenated container with a single count. Odd and even count bits were inverted to indicate an increment or decrement by 1, respectively. A 2-bit "new count value" field was used to indicate a new value of the count beyond an increment/decrement of ±1. Persistency checking across multiple frames was used to synchronize and confirm a new count value. However, this method suffers the added limitation of controlling a count value information within a predefined range of ±1 apart from the requirement of persistency checking for a new count value.

Another method proposed for encoding and controlling count value information was to partition the count value into a constant base value that is near the expected average count value and a "count delta" value to indicate the difference between the base value and the actual count value to be communicated. The base count value does not change, and hence can be checked with persistency. Three copies of the "count delta" field are sent in each frame, each in a separate row, so that majority vote error correction can be performed on this field. An advantage of this method was that it eliminated the slower response and dynamic range problem associated with other methods. However, this method requires provisioning for the "base" value adding a burden on the network management. In addition, the encoding requires 3.5 bytes, which is not optimum and the combination of persistency checking and majority vote error correction adds to the complexity.

A further method for encoding and controlling count value information is based on a technique used in Asynchronous Transfer Mode (ATM) to transmit a running count value. An advantage of sending a running count value in each frame is that if one of the values is corrupted, the count value received in the next frame will correctly indicate the number of payload bytes sent in the previous two frames. A critical disadvantage to this approach in the GMP application is that it only limits the damage caused by transmission errors in the count value rather than preventing the damage by correcting the errors.

As described above, there are two important requirements for the GMP overhead. The first requirement is the ability to detect and correct GMP overhead errors. An incorrect interpretation of the received count value may cause the receiver to introduce several byte errors into the client signal due to misinterpretation of the number of client payload bytes that will be sent in the next interval and due to an incorrect determination of which of the payload area bytes are actual data and which of the payload are bytes are stuff bytes. The second requirement is the ability to adjust the count value from one interval to another in order to accommodate both a non-integer ratio of the client signal and OTN payload byte rates, and also variations in the client signal clock due to wander. Since there is limited number of OTN overhead bytes available for carrying GMP overhead, it is important for the overhead encoding to be compact while at the same time being robust.

Figure 2:
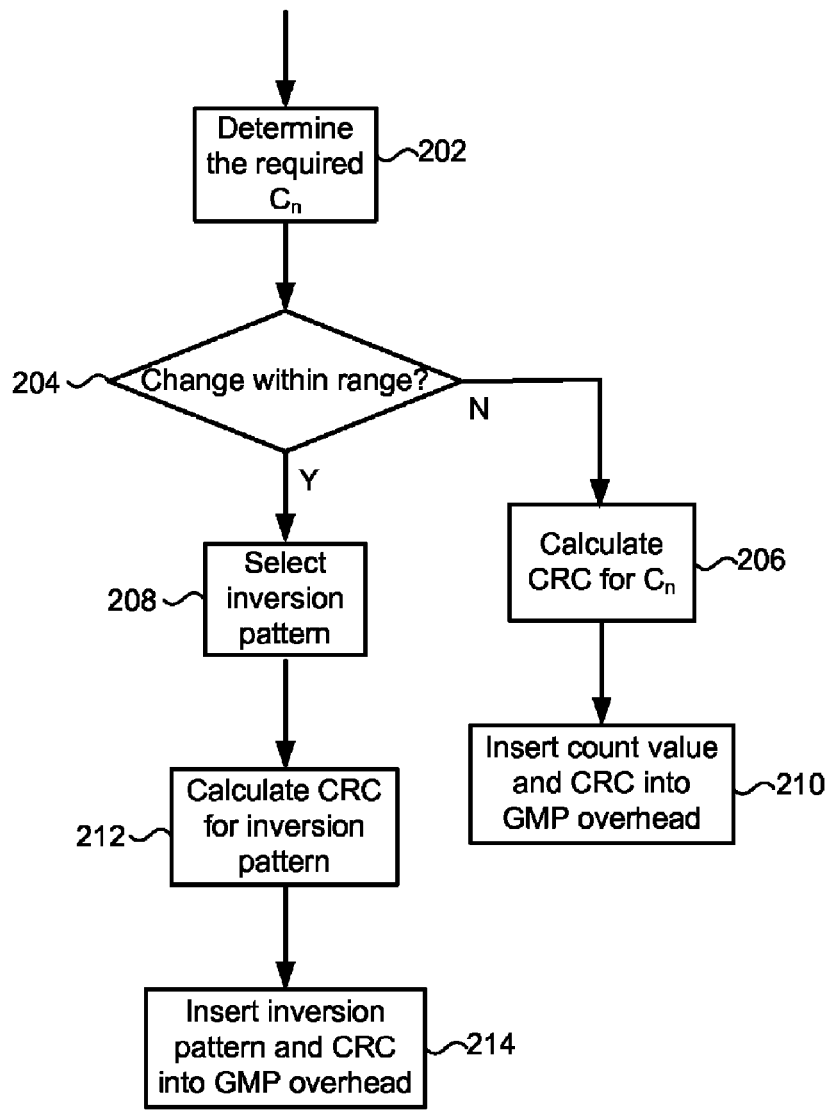
FIG. 2 is a flow diagram illustrating a source encoding method in accordance with an aspect.

Thus, according to an aspect, there is provided a method of communicating count value information in an Optical Transport Network (OTN) signal frame. The method, as illustrated in FIG. 2, comprises determining a count value indicating a number of payload bytes to be sent in a next OTN signal frame (step 202); determining that a change in the count value (Δ) with respect to a current count value is within a predetermined range (Y at step 204); selecting an inversion pattern indicating the change in the count value (step 208); determining a cyclic redundancy check (CRC) code associated with the inversion pattern (step 212); and, inserting the inversion pattern and the CRC code in a Generic Mapping Procedure (GMP) overhead of the OTN signal frame (step 214).

It is noted that the term "frame" is used throughout the description to refer to a single frame and to multi-frames.

The method further comprises: upon determining that the change in the count value with respect to the current count value is not within the predetermined range (N at step 204), calculating a CRC associated with the count value (step 206) and indicating the number of payload bytes to be sent in the next OTN signal frame in the GMP overhead (step 210).

The method of communicating count value information in the OTN signal frame as described herein achieves GMP overhead encoding robustness in an efficient manner. Further, the method allows receiver robustness/complexity tradeoffs to be made based on the known characteristics of the link on which it will be used. The method achieves the encoding and receiver robustness through a combination of: using bit inversion of the transmitted count value to indicate increment or decrement operations; using different inversion patterns to expand the increment/decrement range beyond ±1; and choosing the inversion patterns such that correct increment/decrement, or no change decisions can be made in the presence of any corruption of one of the overhead bytes.

In addition, on the receiving side, the method eliminates the delays associated with persistency checking by: adding a CRC code, which is capable of detecting any error pattern corrupting one of the overhead bytes, in order to immediately validate a completely new count value; and using indicator bits to signal increment, decrement, no change, and a completely new count value.

The inversion patterns are chosen such that proper receiver initialization can be achieved in a minimum, deterministic number of received frames with a minimum number of states in the synchronization state machine and by examining a minimum number of bits in received overhead fields.

A count value, referred to as Cn, is sent in the JC octets of OTN frame i to indicate the number of client signal payload bytes that will be transmitted in the OTN payload area during frame i+1. For the purposes of this mapping, the OTN payload octets are numbered from 1-15232, as illustrated in the OPU payload area 108 of FIG. 1B. The JC octets are in the GMP overhead 106 of the OTN signal frame 100 as shown in FIG. 1B. The contents of octet n in frame i+1 is determined by:

$$\text{Octet } n = \begin{cases} \text{Data for: } (n)(Cn) \text{mod} 15232 < Cn \\ \text{Stuff for: } (n)(Cn) \text{mod} 15232 \geq Cn \end{cases}$$

The result is evenly spaced groupings of payload bytes and all-zero stuff bytes. The average number of payload bytes per frame is determined by the ratio of the encoded client signal rate to the payload container rate:

$Cn$(average)=(15232)(client data stream rate/OTN payload container rate)

Since there are 15232 payload bytes available per OTN (OPU) frame, a minimum of 14 bits are required to communicate the count value of the number of payload bytes being sent per frame. This minimum value can be retained when virtual concatenation is used as long as each member of the virtually concatenated group carries its own count information. The count value or count value information will be referred to as "$Cn$," where n indicates size of the word to which the count applies. For ODU0 signals which are optimized for carrying Gigabit/s Ethernet (GE) clients, the count is C8 since the word size is a single byte (i.e., n=8).

Thus, inverting a predetermined number of the $Cn$ bits provides a compact method for indicating an increment or decrement of the $Cn$ value to be sent in the next frame. The robustness of the inversion method is dictated by the minimum Hamming distance of the different inversion patterns, including the resulting Hamming distance for each overhead byte containing part of the $Cn$ field. Merely inverting the even or odd $Cn$ bits, similar to SONET/SDH pointers, is neither adequate nor optimum for robustness. The Hamming distance can be suitably increased by using an increment/decrement indication.

Moreover, there is a need for increment/decrement of ±2 in some applications. The method according to an embodiment provides this capability by defining two additional inversion patterns. Since the $Cn$ field contains only 14 bits, a first portion of the inversion pattern in one overhead byte would be eight bits while a second portion of the inversion pattern in the second overhead byte would only be six bits. Hence, the Hamming distance is reduced in the second overhead byte.

It is noted that the terms "byte" and "octet" are used interchangeably throughout the description.

Figure 3:
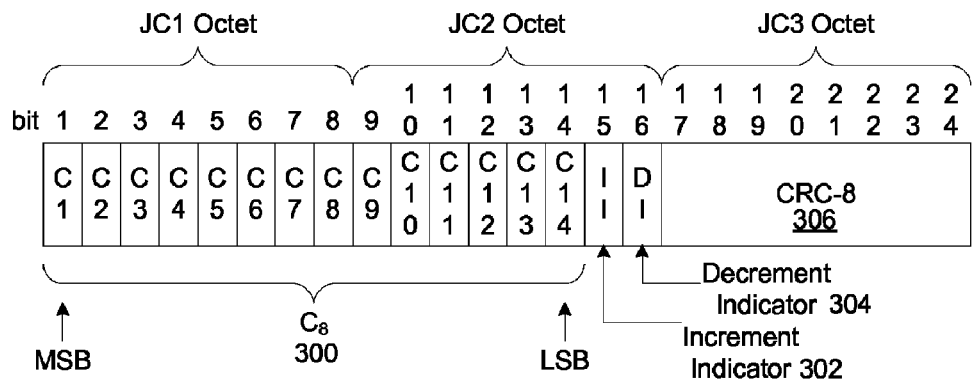
FIG. 3 is a schematic representation of an overhead field format in accordance with an embodiment.

The Hamming distance in the first overhead byte (JC1 Octet) and the second overhead byte can (JC2 Octet) be controlled by using a suitable single bit increment indicator (II) 302 and a decrement indicator (DI) 304 as shown in FIG. 3.

Figure 4:
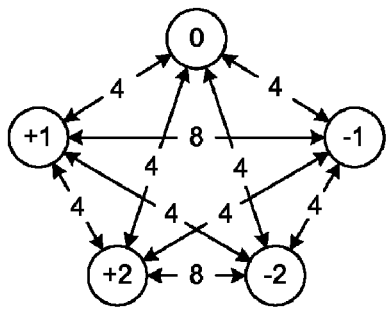
FIG. 4 is an illustration of inversion pattern Hamming distances per-byte in accordance with the embodiment of FIG. 3.

In an embodiment, the Hamming distance in the second overhead byte (JC2 Octet) is restored to that in the first overhead byte by placing an Increment Indicator (II) 302 and a Decrement Indicator (DI) 304 bit in the second overhead byte (JC2 Octet). In other words, the combination of the inversion pattern over six $Cn$ bits plus the associated II and DI bits provides the same Hamming distance in the second overhead byte as in the first overhead byte as shown in FIG. 4. In this embodiment, the II and DI bits and values are chosen such that both overhead bytes carrying the $Cn$ use identical first portion and second portion of the inversion patterns as shown in Table 1. In this example, a value of "1" in the C1-C14, II or DI is regarded as an inversion.

As described earlier, the use of inversion patterns by themselves to indicate $Cn$ changes, as in SONET/SDH pointers, has at least two drawbacks. The first is that due to limitations on the achievable Hamming distance between different inversion patterns, only a limited range of adjustments can be made. The second is that using inversion-type mechanisms alone requires persistency checking for error detection and correction, which introduces latency and complexity.

Unlike the inversion patterns described herein, SONET/SDH pointers occupy two consecutive bytes of the transmitted signal, making both bytes vulnerable to corruption by the same burst error. Consequently, the inversion patterns are detected by examining and counting the number of individual received bits that are inverted in the locations corresponding to each inversion pattern.

TABLE 1

| JC1 bits | | | | | | | | JC2 bits | | | | | | | | |
|---|---|---|---|---|---|---|---|---|---|---|---|---|---|---|---|---|
| C1 | C2 | C3 | C4 | C5 | C6 | C7 | C8 | C9 | C10 | C11 | C12 | C13 | C14 | II | DI | Change |
| 0 | 0 | 0 | 0 | 0 | 0 | 0 | 0 | 0 | 0 | 0 | 0 | 0 | 0 | 0 | 0 | 0 |
| 1 | 0 | 1 | 0 | 1 | 0 | 1 | 0 | 1 | 0 | 1 | 0 | 1 | 0 | 1 | 0 | +1 |
| 0 | 1 | 0 | 1 | 0 | 1 | 0 | 1 | 0 | 1 | 0 | 1 | 0 | 1 | 0 | 1 | −1 |
| 0 | 1 | 1 | 0 | 0 | 1 | 1 | 0 | 0 | 1 | 1 | 0 | 0 | 1 | 1 | 0 | +2 |
| 1 | 0 | 0 | 1 | 1 | 0 | 0 | 1 | 1 | 0 | 0 | 1 | 1 | 0 | 0 | 1 | −2 |
| | | | | | binary value | | | | | | | | | 1 | 1 | >±2 |

On the other hand, since the GMP overhead bytes are spaced 4080 bytes apart in the OTU frame, it can be safely assumed that only one of the overhead bytes is corrupted by an error burst in a given frame. The method of communicating count value information in the OTN signal frame as described herein exploits this situation to simplify the detection process. Since one of the two received bytes containing the $Cn$ field is assumed to contain a valid inversion pattern, simple byte-level comparison is possible rather than counting the per-bit inversions relative to the possible inversion patterns. A CRC error check can be then used to correctly detect and interpret cases where one of the bytes containing the $Cn$ field is corrupt such that it mimics a different valid inversion pattern. Each of these cases is described further below.

In the method of communicating count value information in the OTN signal frame as described herein, the drawbacks associated with using an inversion pattern alone is resolved through the addition of a CRC error check code in a third byte of the overhead (for example, JC3 Octet). By placing each of the overhead bytes, including the CRC, in different rows of the OTN frame, the CRC is guaranteed to detect the corruption of any single overhead byte. An inherent property of an n-bit CRC is that it can detect any single error burst of up to n bits in length. Consequently, whenever the received CRC is correct and the transmitter is not indicating an increment or decrement operation, the receiver knows immediately in that frame (i.e., without persistency checking) the correct value of the received $Cn$ field.

As will be described below, in cases of initialization or recovery from synchronization loss, the receiver may need to receive one additional frame before it can synchronize to a new $Cn$ value, if the source is indicating increment or decrement operations in the initial frame.

The combination of using an inversion pattern and an associated CRC allows for full dynamic range functionality and robustness to any byte errors with fewer bits than would be required for either majority vote or FEC methods. In an embodiment, a total of 24 bits (a 14-bit count value, a single bit II, a single bit DI, and a 8-bit CRC) is distributed among 3 bytes (JC1-JC3 Octets), while in another embodiment 20 bits (a 14-bit count value, a single bit Increment/Decrement Indicator ID, and a 5-bit CRC distributed among 4 bytes. As described in detail below, this combination also allows selecting the complexity of the receiver to match the expected transmission channel error conditions.

In an embodiment of the method of communicating count value information in the OTN signal frame, the Cn information is carried in OTN frame GMP overhead column 16, rows 1-3. The format of these overhead octets is shown in FIG. 3, with octet 1 located in row 1 (JC1), octet 2 located in row 2 (JC2), and octet 3 located in row 3 (JC3). The fields of the GMP overhead are the count value Cn 300, indications of whether Cn for the next frame is incremented (II) 302 or decremented (DI) 304 from the value in the current frame, and a CRC-8 error check code 306 over the three-octet field. In this example, the Cn value is communicated in bits C1-C14, where C1 is the MSB of Cn and C14 is the LSB.

As described earlier, Cn is a binary count of the number of client payload bytes to be transmitted in the next OTN frame. Subsets of the Cn bits are inverted and either the II or DI bit is set to indicate that the count value will be incremented or decremented by ±1 or ±2 for the next frame. Example inversion patterns and II/DI values are shown in Table 1. In the example described herein, a "0" in a Ci location indicates no inversion and a "1" indicates that the corresponding bit is inverted. It can be seen from Table 1 that when II or DI containing a value of "1" is regarded as part of "inversion" pattern, both JC1 and JC2 use identical inversion patterns for a given operation. As illustrated in FIG. 4, the per-byte Hamming distances associated with this inversion pattern encoding are at least four.

Figure 5:
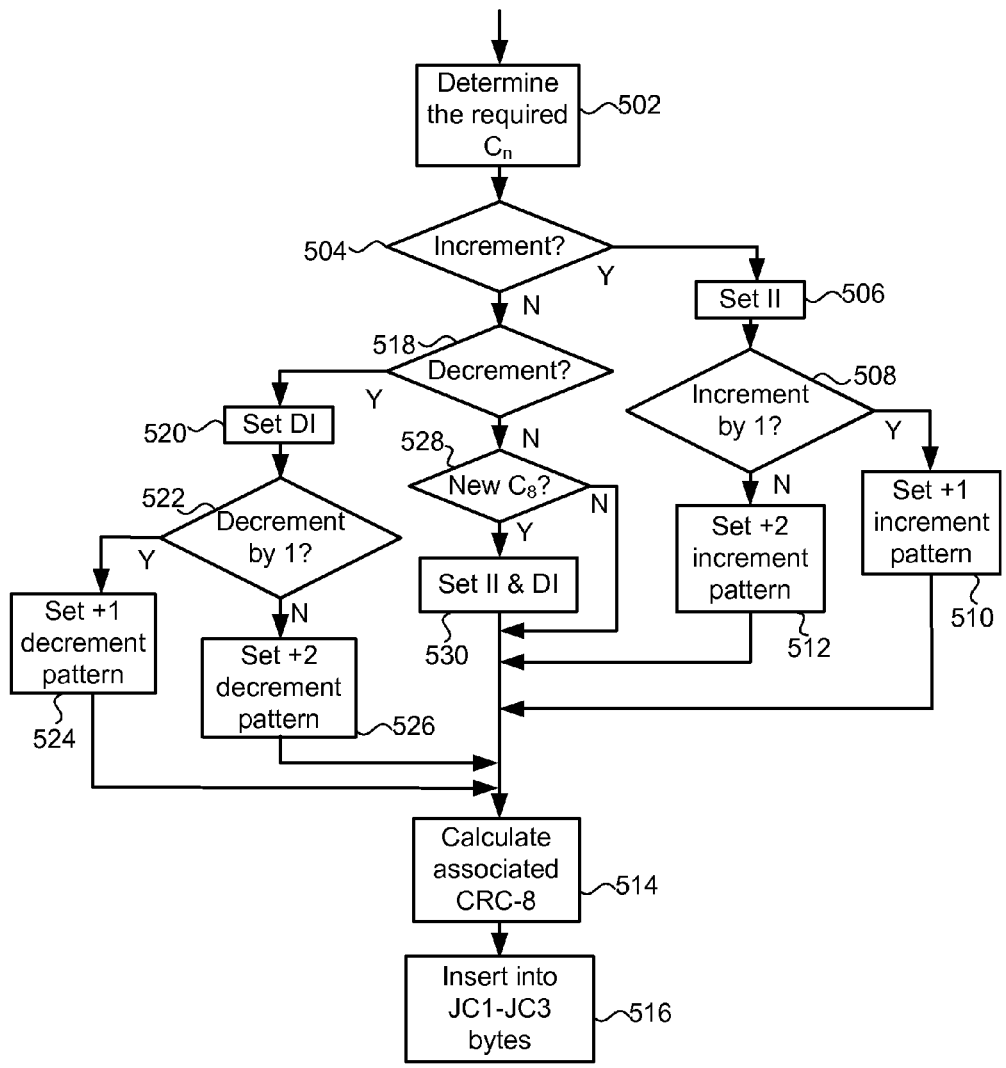
FIG. 5 is a flow diagram illustrating a source encoding method in accordance with an embodiment.

FIG. 5 shows a flow diagram illustrating a source encoding method in accordance with this embodiment. At step 502, the required count value information Cn to be communicated is determined. If an increment to the current count value is to be communicated (step 504), the II is appropriately set (step 506). If the increment to the count value is by 1 (step 508), the inversion pattern corresponding to increment by one is set (step 510). If the increment to the count value is by 2, the inversion pattern corresponding to increment by two is set (step 512). The associated 8-bit CRC is calculated (step 514) and the inversion pattern along with the associated 8-bit CRC is inserted into the JC1-JC3 bytes of the GMP overhead (step 516).

If a decrement to the current count value is to be communicated (step 518), the DI is appropriately set (step 520). If the decrement to the count value is by 1 (step 522), the inversion pattern corresponding to decrement by one is set (step 524). If the decrement to the count value is by 2, the inversion pattern corresponding to decrement by two is set (step 526). As described for the increment scenario, the associated 8-bit CRC is calculated (step 514) and the inversion pattern along with the associated 8-bit CRC is inserted into the JC1-JC3 bytes of the GMP overhead (step 516).

When a new count value information is to be communicated (step 528), both the II and DI are set (step 530) and an associated 8-bit CRC is calculated. The new count value and the associated CRC is then inserted into the JC1-JC3 bytes of the GMP overhead (step 516). If there is no change in the count value information, neither the II nor DI are set, none of the bits of Cn are inverted, and associated 8-bit CRC is calculated and is inserted along with the "non-inverted" Cn value into JC1-JC3 bytes of the GMP overhead (step 516).

In the example described above, an 8-bit CRC generator polynomial is chosen to meet two criteria. The first criteria is that the polynomial be able to detect the largest number of errors possible for a CRC-8 over a 16-bit data field, which is three errors. The second criteria is that the polynomial be optimized for implementation in parallel logic in order to reduce the complexity and latency of the implementation. The generator polynomial $g(x)=x^8+x^3+x^2+1$ is an optimum choice for meeting these criteria. As illustrated in Table 2, no more than seven terms are required to calculate each CRC check bit, which allows FPGA implementations with only two 4-input logic cells per bit.

Another advantage of using the II and DI fields and the CRC error protection relative to just using bit-inversion patterns is to avoid a condition known as oscillation in SONET/SDH pointers. In SONET/SDH pointers, when the receiver's expected pointer value register comes to contain certain values (e.g., due to corruption or some typical test conditions), the receiver will interpret a constant pointer value from the source as being a command to oscillate between incrementing and decrementing. This condition is not detectable. The use of II and DI bits as described herein prevent this possibility by providing an explicit indication of whether the transmitter is signaling an increment or decrement operation. Further, the receiver can confirm the correctness of the current expected Cn value by comparing it to the received value whenever the CRC indicates that no transmission channel errors have occurred.

As described earlier, the method of communicating count value information as described herein allows for the receiver implementation complexity to be matched to the expected error characteristics of the transmission channel.

Figure 6:
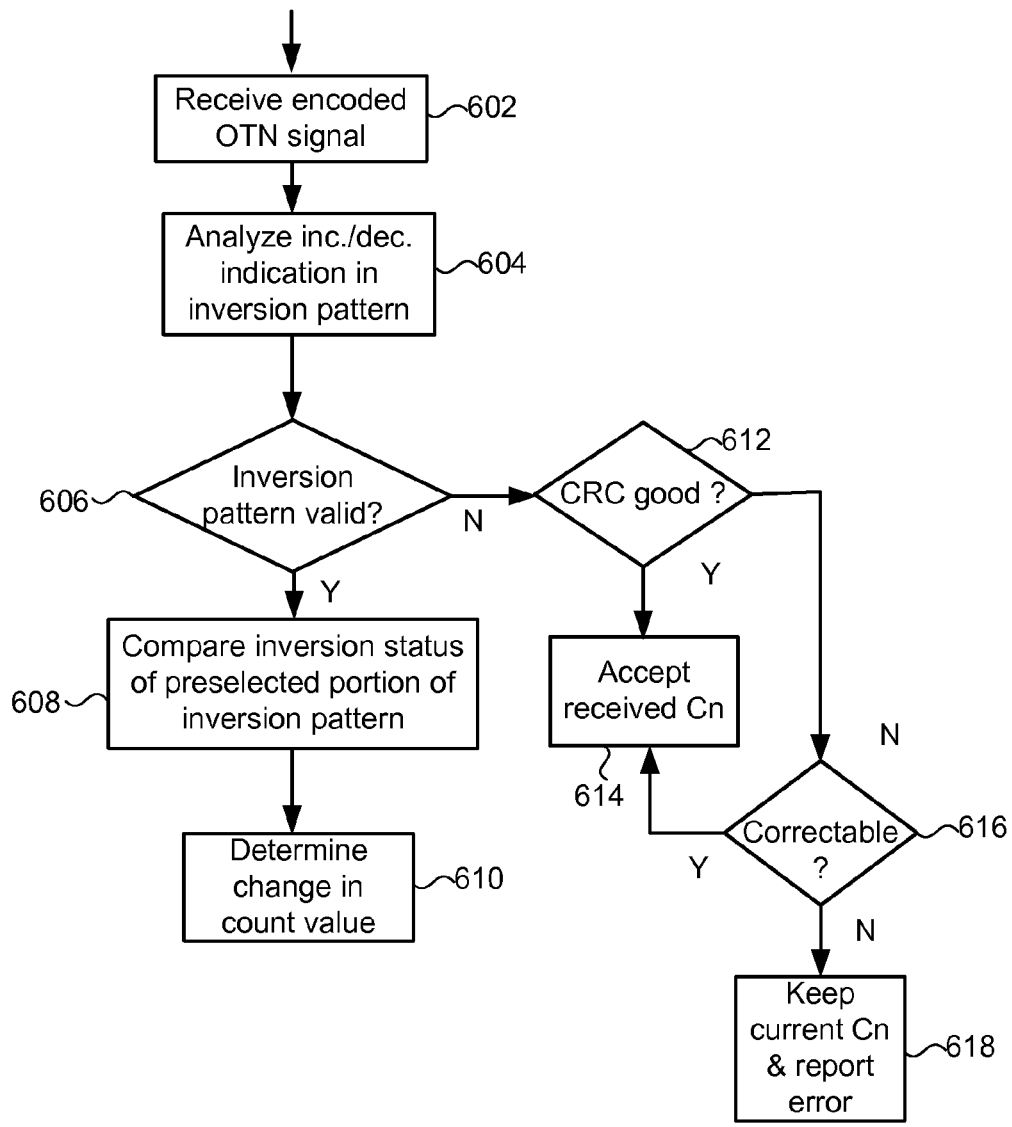
FIG. 6 is a flow diagram illustrating a decoding method in accordance with an aspect.

In an aspect, there is provided a method of determining count value information from a GMP overhead of an OTN signal frame encoded according the method described above. The method of determining the count value information comprises, as shown in FIG. 6, receiving an encoded OTN signal frame (step 602); analyzing the increment/decrement indication in the inversion pattern of the GMP overhead of the OTN signal frame (step 604) to determine that the inversion pattern is valid (step 606); and, comparing an inversion status of a preselected portion of the inversion pattern (step 608) to determine the change in the count value indicated by the inversion pattern in the GMP overhead of the OTN signal frame (step 610).

TABLE 2

| mapping overhead bits | CRC checksum bits | | | | | | | |
|---|---|---|---|---|---|---|---|---|
| | crc1 | crc2 | crc3 | crc4 | crc5 | crc6 | crc7 | crc8 |
| JC1.C1 | | X | | | | X | | X |
| JC1.C2 | X | | X | | | X | | |
| JC1.C3 | | X | | X | | | X | |
| JC1.C4 | | | X | | X | | | X |
| JC1.C5 | X | | | X | | | X | |
| JC1.C6 | | X | | | X | | | X |
| JC1.C7 | X | | X | | | | X | |
| JC1.C8 | | X | | X | | | | X |
| JC2.C9 | X | | X | | X | X | X | |
| JC2.C10 | | X | | X | | X | X | X |
| JC2.C11 | X | | X | | X | X | | X |
| JC2.C12 | X | X | | X | | | | |
| JC2.C13 | | X | X | | X | | | |
| JC2.C14 | | | | X | X | | X | |
| JC2.II | | | | | X | X | | X |
| JC2.DI | | | | | X | X | | X |

The method of determining the count value information further comprises, validating the CRC code in the GMP overhead of the OTN signal frame (step 612). Upon determination that the CRC code is valid and the received inversion pattern is not valid, the received Cn is accepted (step 614).

If the received CRC code is not valid, a determination is made as to whether the CRC code is correctable (step 616) and, if the CRC code is correctable, the received Cn is accepted (step 614). If the CRC code is not correctable, the current Cn value is retained and an error is reported (step 618).

Figure 7:
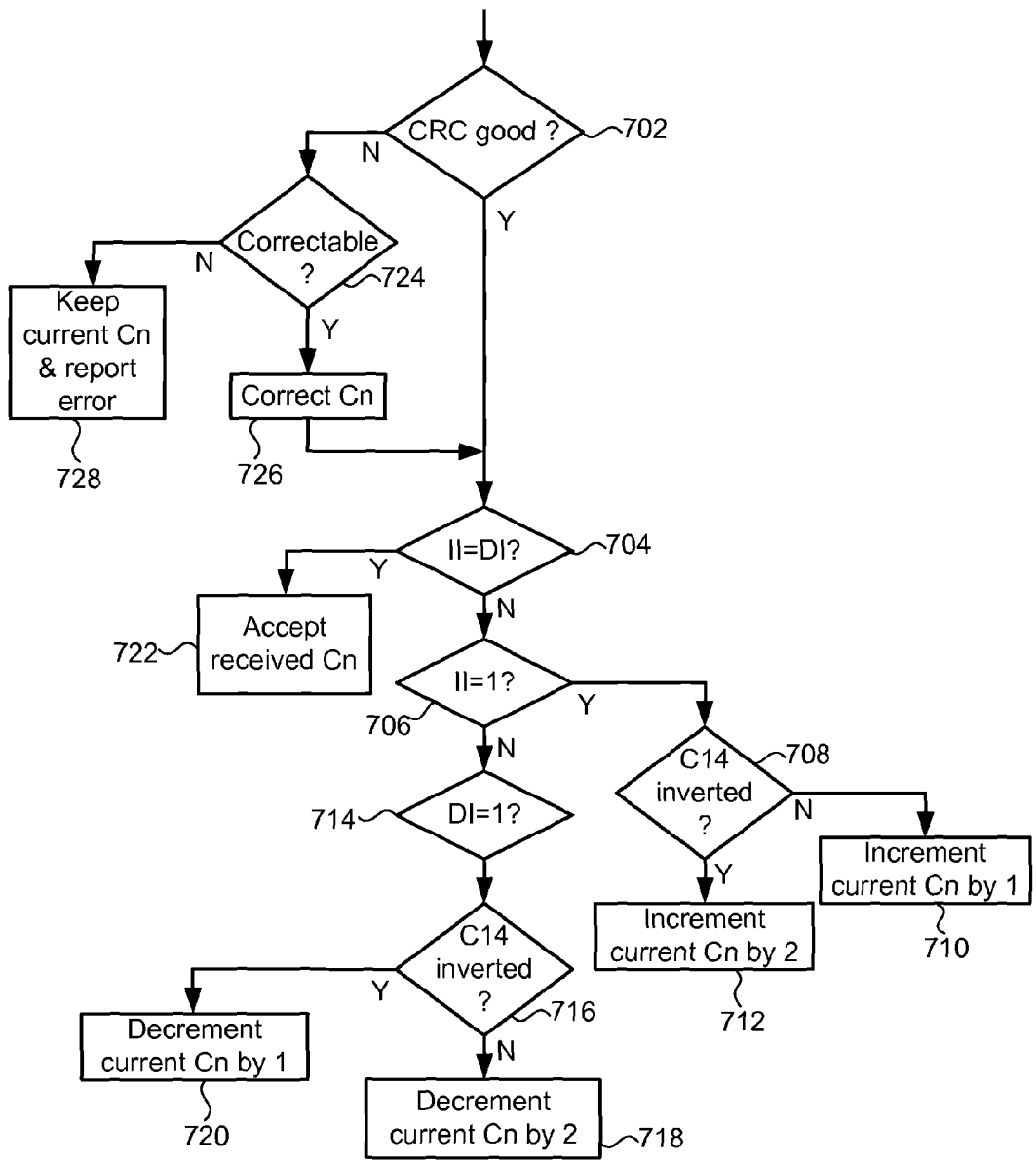
FIG. 7 is a flow diagram illustrating a decoding method for channels with random bit errors in accordance with an embodiment.

The above method of determining the count value information from an encoded GMP overhead of an OTN signal frame can be implemented in several manners depending on the expected error characteristics of the transmission channel. FIG. 7 shows a flow diagram illustrating a decoding method for channels with random bit errors (i.e. no burst errors) with low bit error rate (BER) is expected in accordance with an embodiment.

An example of a channel with random bit errors with low BER is a short reach fiber or an electrical connection within a system. With this implementation, the CRC is used to correct single bit errors on the received GMP overhead. After random bit error correction (if required), only the II and DI bits need to be observed to determine whether an increment or decrement (or a new count value indication) is being signaled. If an increment or decrement is being signaled, only the Cn LSB, for example, bit C14, needs to be compared to the expected value in order to determine the magnitude of the increment or decrement.

In FIG. 7, the CRC code is validated (step 702). Upon receiving a valid CRC code, the II and DI are compared (step 704). If the II and DI are not identical, the status of the II bit is determined (step 706). If the II bit is inverted (i.e., for example II=1), the status of the C14 bit is determined (step 708). If the C14 bit is not inverted, the receiver interprets an indication of an increment to the current count value by 1 (step 710) without checking the status of remainder of the inversion pattern bits. On the other hand, if the C14 bit is inverted, the receiver interprets an indication of an increment to the current count value by 2 (step 712) without checking the status of remainder of the inversion pattern bits.

If the received CRC code is not valid, a determination is made as to whether the CRC code is correctable (step 724) and, if the CRC code is correctable, the receiver interprets that the received Cn is valid (step 726) and proceeds to step 704 described above. If the CRC code is not correctable, the current Cn value is retained and an error is reported (step 728).

If the II bit not inverted (i.e., for example, II=0), the status of the DI bit is determined (step 714). If the DI bit is inverted (i.e., for example DI=1), the status of the C14 bit is determined (step 716). If the C14 bit is inverted, the receiver interprets an indication of a decrement to the current count value by 1 (step 718) without checking the status of remainder of the inversion pattern bits. On the other hand, if the C14 bit is not inverted, the receiver interprets an indication of a decrement to the current count value by 2 (step 720) without checking the status of remainder of the inversion pattern bits.

If the II and DI bit are identical, the received Cn is accepted (step 722). The received Cn could indicate no change in the count value or a new count value.

If burst errors are possible on the transmission channel, then single error correction is no longer practical since the error syndromes of some received burst error patterns can mimic the syndromes of single bit errors. The receiver implementations described below are designed for transmission channels where burst errors are possible, and consequently only use the CRC check in order to validate the reception of either the expected or a completely new count value, as indicated by the II and DI having the same value.

Figure 8:
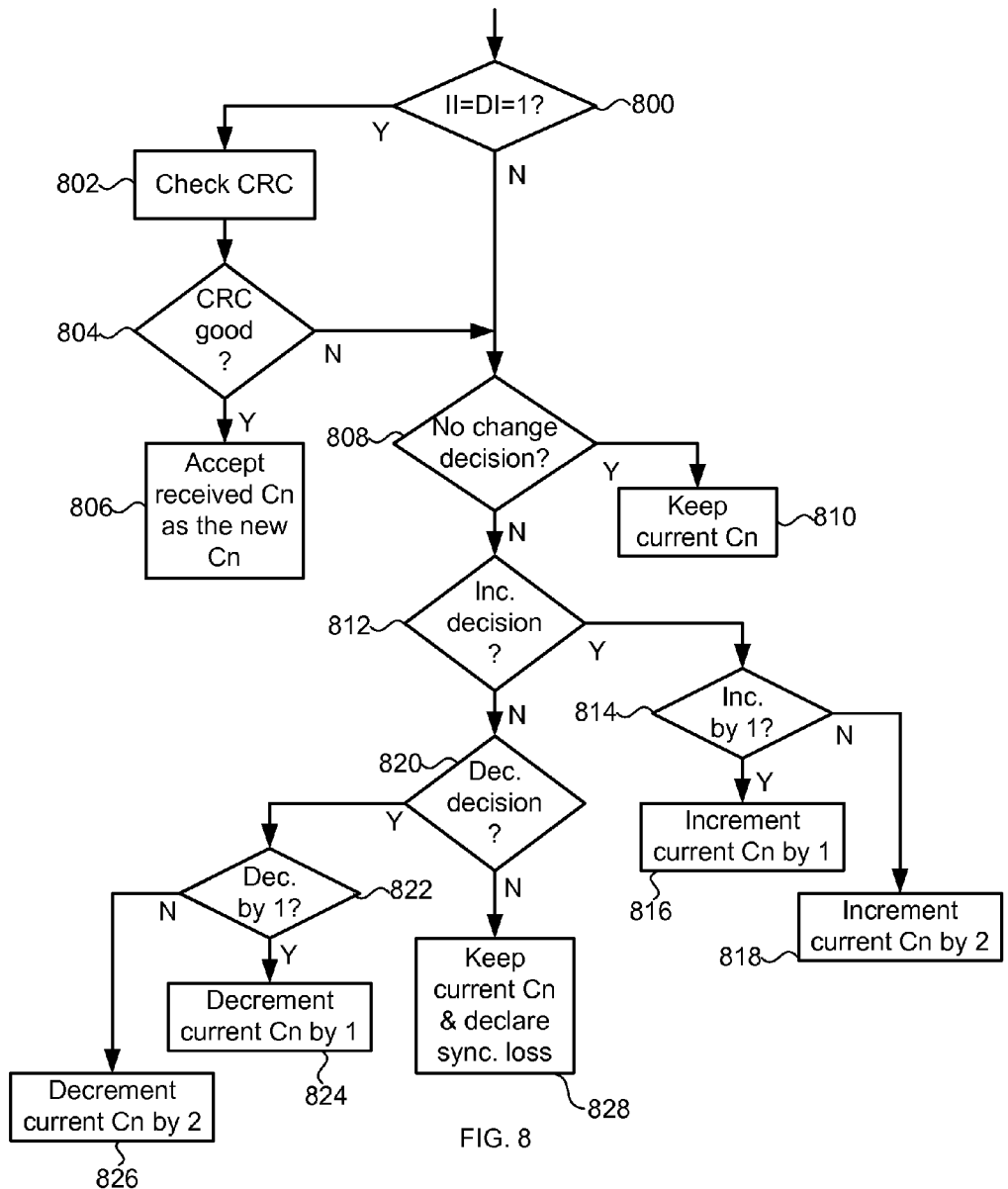
FIG. 8 is a flow diagram illustrating a decoding method for channels with burst errors in accordance with an embodiment.

FIG. 8 shows a flow diagram illustrating a decoding method for channels with burst errors in accordance with an embodiment. As noted earlier, receiving II=DI and a valid CRC is the criteria for accepting the received count value as the valid current count. If either of these conditions is not true, then the receiver checks for proper inversion patterns in JC1 and/or JC2 that indicate an increment or decrement. If no valid pattern is found, the receiver retains its current expected count value, and declares a loss of synchronization between the receiver and transmitter.

At step 800, the values of the received II and DI bits are compared to determine whether II=DI=1 (in this example, this implies that both II and Bit bits are inverted). If yes, the received CRC code is checked (step 802) and validated (step 804). If the received CRC code is valid, the receiver accepts the received Cn as the new Cn (step 806). If a determination is made that the II and DI bits are both not inverted or if the CRC code is not validated, the method proceeds to step 808. A determination is made as to whether the received Cn is the same as the current Cn at step 808. If the received Cn is the same as the current Cn, the current Cn is retained (step 810).

If the received Cn is not the same as the current Cn, a decision is made as to whether the received inversion pattern indicates an increment (step 812) according to decision logic shown in Table 3. If the increment decision is true, then a determination is made as to whether the increment is by 1 (step 814) and if true, the receiver interprets the received Cn to indicate an increment in the count value by 1 (step 816). Else, the receiver interprets the received Cn to indicate an increment in the count value by 2 (step 818).

TABLE 3

No change decision = true if (C1-C8 are not inverted)
or (C9-C14 are not inverted and II = DI = 0)
Inc. decision = true if comparison of
received Cn to current Cn shows an indication to
increment by 1 or 2:
Inc. by 1 = true if (C1, C3, C5 & C7 are
inverted and C2, C4, C6 & C8 are NOT inverted)
or
(C9, C11 & C13 are inverted and C10, C12 & C14 are NOT
inverted and II = 1 and DI = 0)
Inc. by 2 = true if
(C2, C3, C6 & C7 are inverted and C1, C4, C5 & C8 are NOT inverted)
or
(C10, C11 & C14 are inverted and C9, C12 & C13 are NOT
inverted and II = 1 and DI = 0)
Dec. decision = true if comparison of
received Cn to current Cn shows an indication to decrement by
1 or 2:
Dec. by 1 = true if (C2, C4, C6 & C8
are inverted and C1, C3, C5 & C7 are NOT inverted)
or
(C10, C12 & C14 are inverted and C9, C11 & C13 are NOT
inverted and II = 0 and DI = 1)
Dec. by 2 = true if
(C1, C4, C5 & C8 are inverted and C2, C3, C6 & C7 are NOT inverted)
or
(C9, C12 & C13 are inverted and C10, C11 & C14 are NOT
inverted and II = 0 and DI = 1)

If the increment decision is false, then a determination is made whether the received inversion pattern indicates a decrement (step 820) according to the decision logic shown in Table 3. If the decrement decision is true, then a determination is made as to whether the decrement is by 1 (step 822) and if true, the receiver interprets the received Cn to indicate a decrement in the count value by 1 (step 824). Else, the receiver interprets the received Cn to indicate a decrement in the count value by 2 (step 826).

If the decrement decision is false, the receiver retains the current Cn and declares a synchronization loss (step 828).

TABLE 4

| Valid JC1 Inversion Pattern = true if | Valid JC2 Inversion Pattern = true if |
|---|---|
| C1, C3, C5 & C7 are inverted AND C2, C4, C6 & C8 are NOT inverted (Inc. +1) | C10, C11 & C14 are inverted AND C9, C12 & C13 are NOT inverted and II = 1 and DI = 0 (Inc. +1) |
| or | or |
| C2, C3, C6 & C7 are inverted AND C1, C4, C5 & C8 are NOT inverted (Inc. +2) | C9, C11 & C13 are inverted AND C10, C12 & C14 are NOT inverted and II = 1 and DI = 0 (Inc. +2) |
| or | or |
| C2, C4, C6 & C8 are inverted AND C1, C3, C5 & C7 are NOT inverted (Dec. −1) | C10, C12 & C14 are inverted AND C9, C11 & C13 are NOT inverted and II = 0 and DI = 1 (Dec. −1) |
| or | or |
| C1, C4, C5 & C8 are inverted AND C2, C3, C6 & C7 are NOT inverted (Dec. −2) | C9, C12 & C13 are inverted AND C10, C11 & C14 are NOT inverted and II = 0 and DI = 1 (Dec. −2) |

Figure 9:
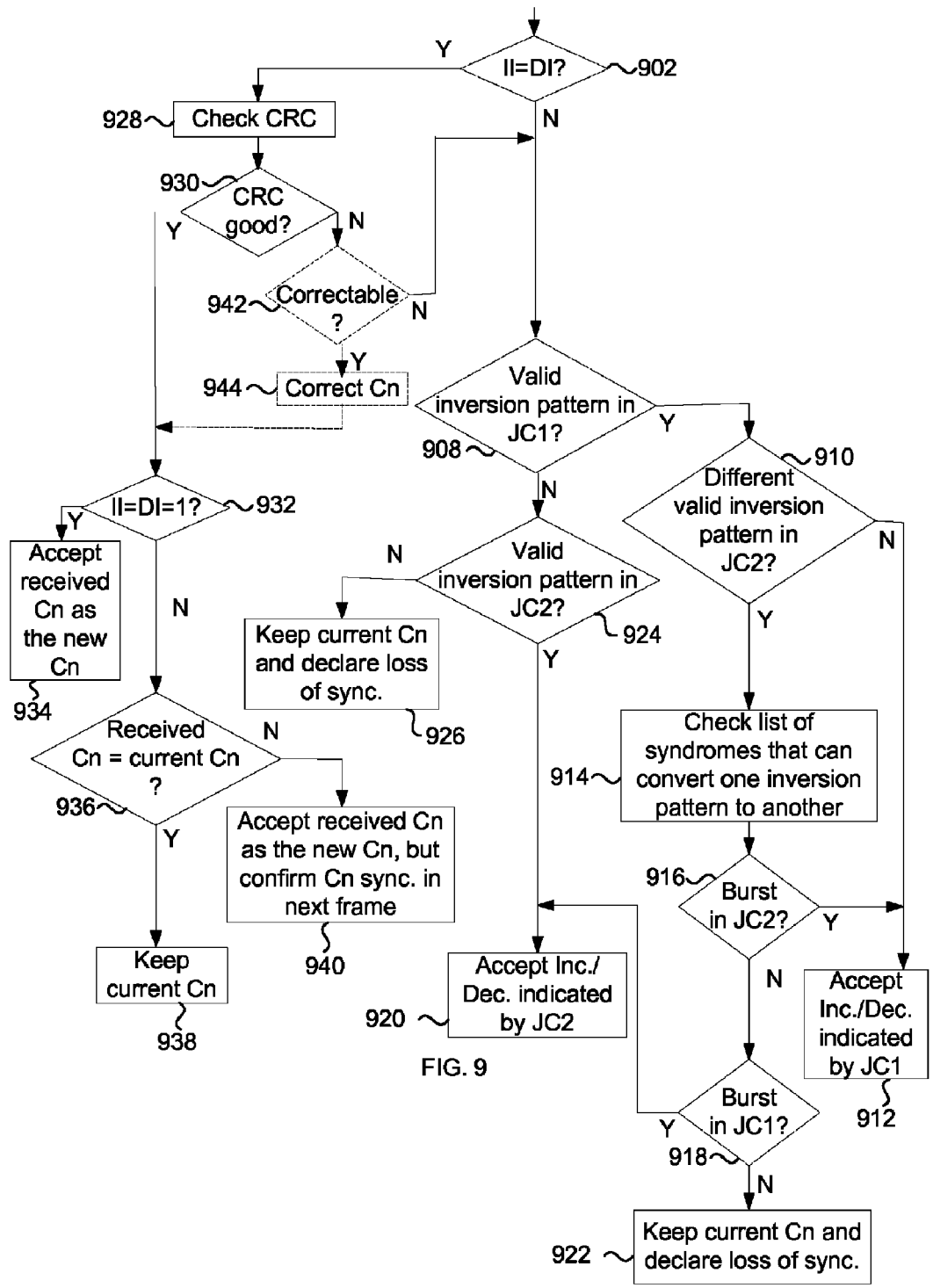
FIG. 9 is a flow diagram illustrating a decoding method for channels with burst errors in accordance with another embodiment.

Another embodiment of the receiver implementation is illustrated in FIG. 9. The receiver implementation of FIG. 9 provides two additional performance improvements related to handling potential received burst error patterns as described below.

Referring to FIG. 9, upon determination that the II and DI bit are not identical (step 902), a decision is made as to whether the received inversion pattern in the JC1 byte is valid (step 908). If the received JC1 byte contains a valid inversion pattern, the receiver determines if the received inversion pattern in the JC2 byte is the same as that in the JC1 byte (step 910). If the received inversion patterns in JC1 byte and JC2 bytes match, the receiver accepts the increment or decrement indicated by the received inversion pattern in the JC1 byte (step 912). The decision logic for a valid inversion pattern in the JC1 and JC2 bytes and the associated increment/decrement indication are listed in Table 4.

The receiver implementation of FIG. 9 can handle received burst errors that corrupt either JC1 or JC2 such that they are received with a value that mimics a different valid inversion pattern. As listed in Table 5, there are a limited number of error burst patterns that can cause such a corruption of JC1 or JC2 (seven related to JC1 and seven related to JC2). When JC1 and JC2 are received with different valid inversion patterns, the receiver compares the CRC error syndrome of the received GMP overhead against the table of syndromes for known problem burst error patterns to determine whether JC1 or JC2 has been corrupted.

If at step 910, the receiver determines that the received inversion pattern in the JC2 byte is valid but different from that in the JC1 byte, a checklist of syndromes that can convert one inversion pattern to another, as listed in Table 5, is traversed to determine if there is burst error in the JC2 byte (step 916) or if there is a burst error in the JC1 byte (step 918). Upon determination of a burst error in the JC2 byte, the receiver accepts the increment or decrement indicated by the received inversion pattern in the JC1 byte (step 912). Upon determination of a burst error in the JC1 byte, the receiver accepts the increment or decrement indicated by the received inversion pattern in the JC2 byte (step 920).

In the rare event that there the received inversion pattern in the JC2 byte is valid but different from a valid inversion pattern in the JC1 byte and the receiver is unable to determine a burst error in either the JC1 byte or the JC2 byte, the receiver retains the current Cn value and declares a loss of synchronization. As noted in Table 5, if a Single Error Correction (SEC) circuit is used, this pattern can be recognized by the SEC circuit. (see note in Table 5).

TABLE 5

| JC1 problem burst syndromes: | JC2 problem burst syndromes: |
|---|---|
| 10001000 | 01101010 |
| 10010101 | 10111110 |
| 00011101 | 11010100 |
| 10101111 | 00011011 |
| 00100111 | 01110001 |
| 00111010 | 10100101 |
| 10110010 | 11001111 |

NOTE:
A burst error that produces a received inversion pattern of 01010111 in JC2 will mimic a single error in C2 of JC1. If "corrected" as a C2 error, it would result in II = DI = 1. Consequently, if SEC is used, this pattern should be recognized by the SEC circuit.

If at step 908, the receiver determines that the received inversion pattern in the JC1 byte is invalid, a decision is made as to whether the received inversion pattern in the JC2 byte is valid (step 924). If the received JC2 byte contains a valid inversion pattern, the receiver accepts the increment or decrement indicated by the received inversion pattern in the JC2 byte (step 920). The decision logic for a valid inversion pattern in the JC1 and JC2 bytes and the associated increment/decrement indication are listed in Table 4.

If the received inversion pattern in both the JC1 byte and the JC2 byte are invalid, the receiver retains the current Cn value and declares a loss of synchronization (step 926).

Upon determination that the II and DI bit are identical (step 902), the receiver checks if the received CRC code (step 928). If the received CRC code is valid (step 930), the receiver implementation follows a similar logic to that of FIG. 8. Specifically, if the received CRC code is valid, the receiver compares the values of the II bit and the DI bit (step 932). If the II bit and the DI bit are both "inverted", the receiver accepts the received Cn as the new Cn (step 934). If the II bit and DI bit are not "inverted", the receiver determines if the received Cn is same as the current Cn (step 936) and the receiver retains the current Cn value (step 938) if the determination at step 936 is positive.

If at step 936, the received Cn is not the same as the current Cn, the receiver accepts the received Cn, but confirms the count value information and the synchronization in the next OTN frame (step 940).

The receiver implementation of FIG. 9 allows an option of limited single error correction. This option is illustrated with the dashed line portion of the figure (step 942 and 944). As noted above, burst error patterns can have syndromes that mimic those of single bit errors. Due to the robustness of the inversion patterns in the JC1 byte and the JC2 byte, however, improperly 'correcting' a burst error will result in an error pattern in the JC1 byte or the JC2 byte that the receiver can properly detect during its inversion pattern checking. A problem arises for the receiver is if it improperly 'corrected' JC2 such that it resulted in II=DI when an increment or decrement operation was being signaled by the transmitter. With the chosen CRC polynomial as indicated in Table 2, there is only one burst error pattern that would both mimic a single bit error and result in this II=DI situation as a result of the attempt to apply single error correction. See note in Table 5. The receiver can regard this syndrome as uncorrectable. Consequently, 15 of the potential 16 single error patterns in JC1 and JC2 can be corrected without degrading the performance of the receiver by attempting to correct burst errors that mimic these single error syndromes.

Figure 10:
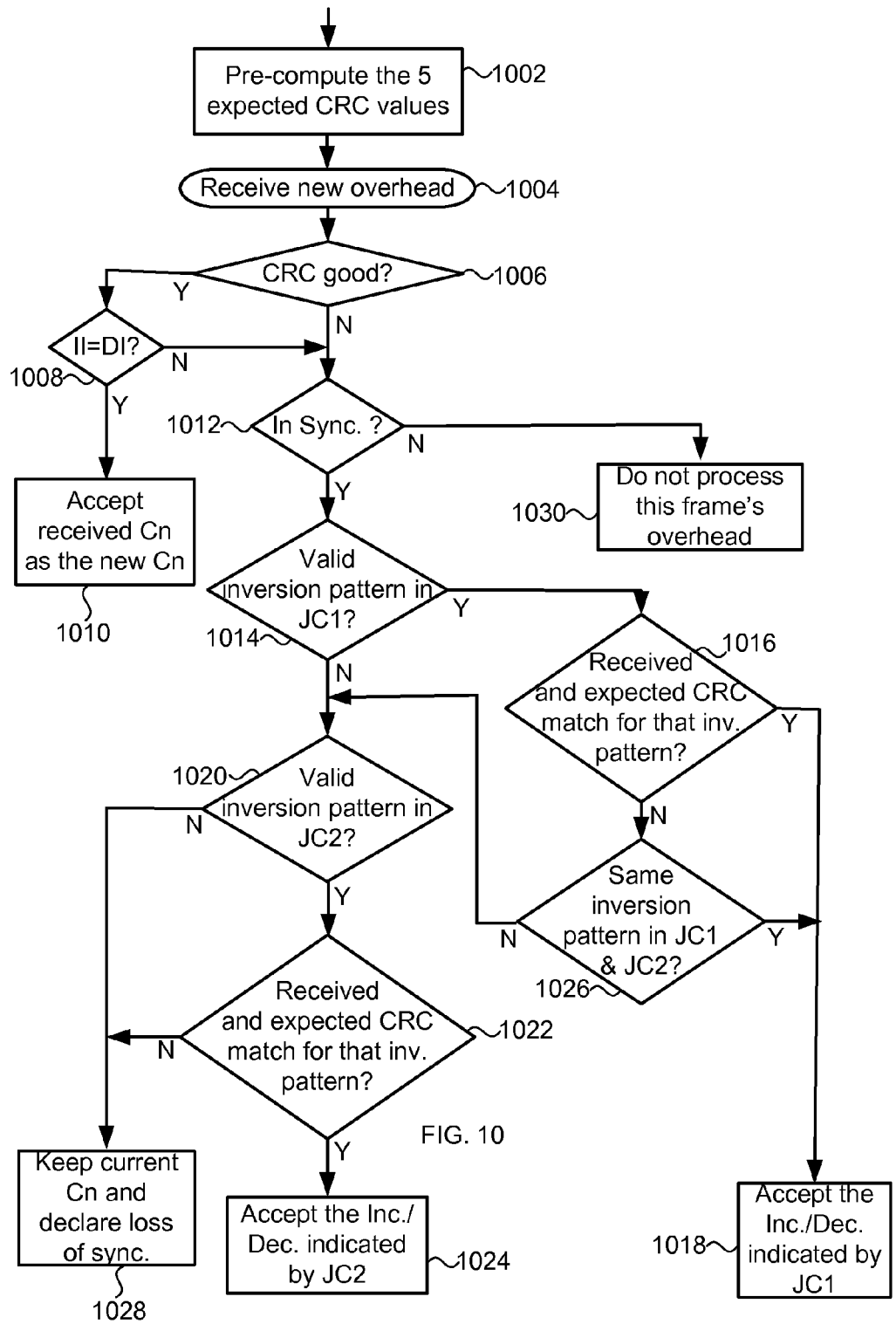
FIG. 10 is a flow diagram illustrating a decoding method for channels with burst errors in accordance with yet another embodiment.

Another embodiment of a receiver implementation is illustrated in FIG. 10. The receiver implementation of FIG. 10 is optimized for channels where burst errors can occur. A feature of this receiver is that it can handle errors by looking for agreement between the information in at least two of the three received JC1, JC2, and JC3 bytes. As discussed above, these scenarios assume that only a single GMP overhead byte will be corrupted by transmission channel errors. The receiver implementation of FIG. 10 exploits the fact that during normal operation (i.e., where no totally new count value would be sent) there are only five GMP overhead values the transmitter can send in each given frame, which can be pre-computed. Specifically, the transmitter will send its current count value with either no change or one of the four possible inversion patterns applied to the count value with the II bit or the DI bit set accordingly. As long as the receiver's expected count value is synchronized to the transmitter, it can pre-calculate the five CRC values associated with the five potential GMP overhead values the transmitter can send (step 1002) prior to receiving a new GMP overhead (step 1004). As with the other receiver implementation examples, if the CRC code is valid (step 1006) and II=DI (step 1008), the count value is accepted directly (step 1010).

The potential scenarios when the received GMP overhead has been corrupted are listed in Table 6. As described earlier, if the receiver's expected count value is synchronized to the transmitter (step 1012) and if the received inversion pattern in the JC1 byte is valid (step 1014) and the received CRC corresponds to one of the five expected CRC values (step 1016), the JC1 interpretation of the increment/decrement indication is accepted (step 1018). Similarly, if the received inversion pattern in the JC2 byte is valid (step 1020) and the received CRC corresponds to one of the five expected CRC values (step 1022), the JC2 interpretation of the increment/decrement indication is accepted (step 1024). These scenarios fully cover situations where a burst error corrupts JC1 or JC2 such that they are received with a value that mimics a different valid inversion pattern. If the inversion patterns of JC1 and JC2 agree (step 1026), the interpretation of the increment/decrement indicated by the JC1 byte is accepted. This situation covers the case of the CRC code being corrupted by a transmission channel error. Lack of agreement between any pair of the JC1, JC2, and JC3 bytes indicates that the receiver has lost synchronization with the transmitter (step 1028). While FIG. 10 illustrates the comparison of the JC1, JC2, and JC3 information in a serial flow, this receiver could also be implemented by comparing each of the three pairings in parallel.

TABLE 6

| Error burst scenario | Received JC1 status | Received JC2 status | Received JC3 (CRC) status | Resulting action |
|---|---|---|---|---|
| 1 | Invalid pattern | Valid correct pattern | CRC corresponds to the JC2 pattern | Accept action indicated by JC2 |
| 2 | Valid correct pattern | Invalid pattern corresponds to the JC1 pattern | CRC indicated by JC1 | Accept action |
| 3 | Valid but corrupt pattern | Valid correct pattern | CRC corresponds to the JC2 pattern | Accept action indicated by JC2 |
| 4 | Valid correct pattern | Valid but corrupt pattern | CRC corresponds to the JC1 pattern | Accept action indicated by JC1 |

TABLE 6-continued

| Error burst scenario | Received JC1 status | Received JC2 status | Received JC3 (CRC) status | Resulting action |
|---|---|---|---|---|
| 5 | Valid correct pattern | Valid correct pattern | Invalid (corrupted) CRC | Accept the action indicated by both JC1 and JC2 |
| 6 | No agreement between any pair of the JC1, JC2, and JC3 bytes | | | Receiver has lost synchronization |

In the event that the receiver's expected count value is not synchronized to the transmitter (step 1012), the receiver will not process the received GMP overhead (step 1030).

TABLE 7

| Valid JC1 Inversion Pattern = true if C1-C8 are NOT inverted (No Change) or | Valid JC2 Inversion Pattern = true if C10-C14 are NOT inverted and II = DI = 0 (No Change) or |
|---|---|
| C1, C3, C5 & C7 are inverted AND C2, C4, C6 & C8 are NOT inverted (Inc. +1) or | C10, C11 & C14 are inverted AND C9, C12 & C13 are NOT inverted and II = 1 and DI = 0 (Inc. +1) or |
| C2, C3, C6 & C7 are inverted AND C1, C4, C5 & C8 are NOT inverted (Inc. +2) or | C9, C11 & C13 are inverted AND C10, C12 & C14 are NOT inverted and II = 1 and DI = 0 (Inc. +2) or |
| C2, C4, C6 & C8 are inverted AND C1, C3, C5 & C7 are NOT inverted (Dec. -1) or | C10, C12 & C14 are inverted AND C9, C11 & C13 are NOT inverted and II = 0 and DI = 1 (Dec. -1) or |
| C1, C4, C5 & C8 are inverted AND C2, C3, C6 & C7 are NOT inverted (Dec. -2) | C9, C12 & C13 are inverted AND C10, C11 & C14 are NOT inverted and II = 0 and DI = 1 (Dec. -2) |

A decision logic for determining valid inversion pattern in the JC1 byte and the JC2 byte along with the interpretation of corresponding increment/decrement indication is shown in Table 7.

In another aspect, a method of synchronization between a transmitted GMP overhead of the OTN signal frame and a received GMP overhead of the OTN signal frame is provided. Upon determination that a synchronization between a transmitted GMP overhead of the OTN signal frame and a received GMP overhead of the OTN signal frame has been lost, a subsequently received GMP overhead of the OTN signal is analyzed to validate the CRC code. A hunt state is entered based on the increment/decrement indication and a preselected portion of the inversion pattern of the subsequently received GMP overhead of the OTN signal frame. An increment/decrement status is determined based on the hunt state and the transmitted GMP overhead of the OTN signal frame and the received GMP overhead of the OTN signal frame are synchronized.

Figure 11:
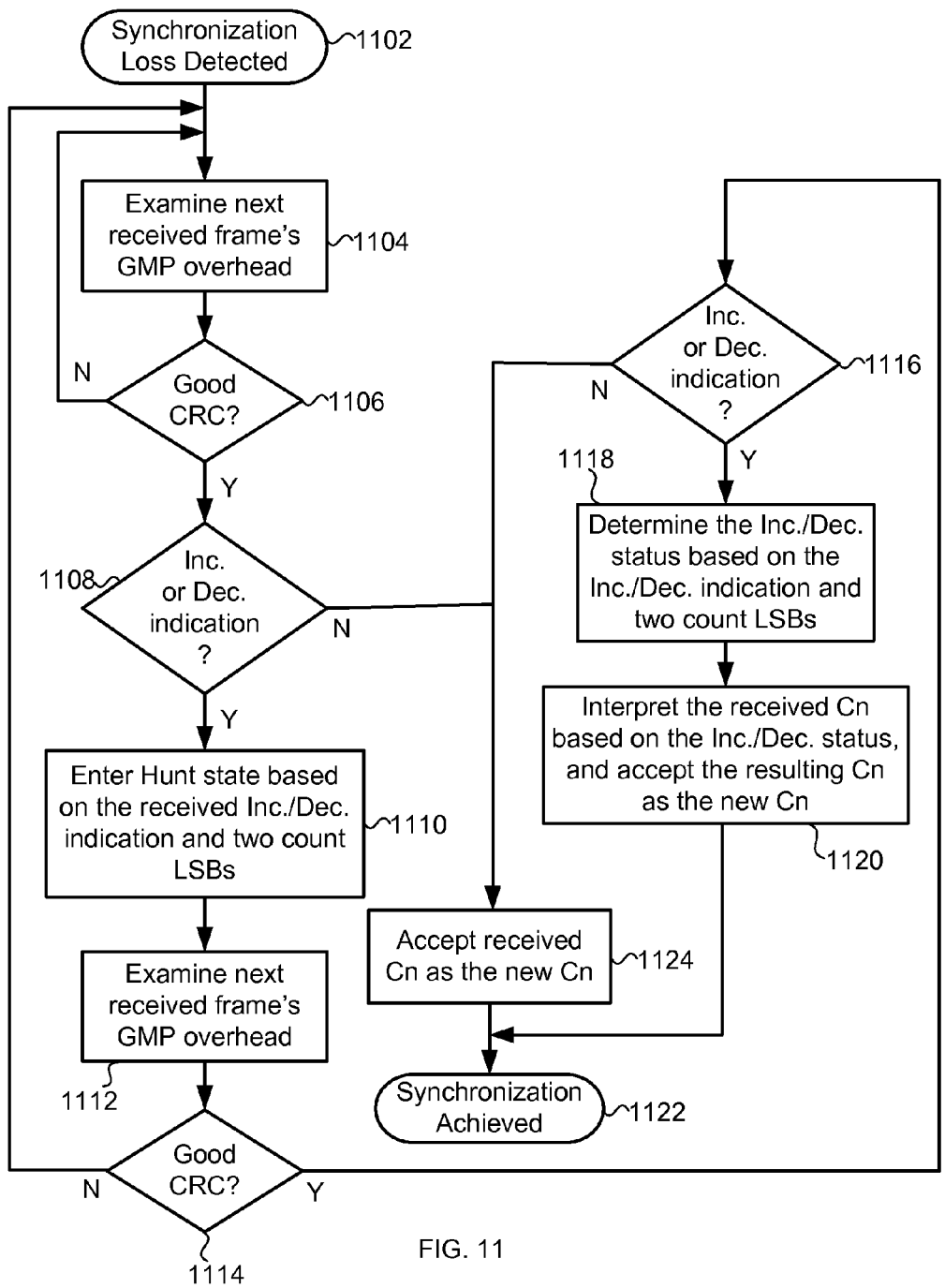
FIG. 11 is a flow diagram illustrating a synchronization method in accordance with an aspect.

FIG. 11 shows a flow diagram illustrating an example synchronization method. The choice of inversion patterns, for example, as shown in Table 1, affects the complexity of the process of synchronizing the receiver and transmitter count values. Specifically, the inversion patterns are chosen such that if the receiver receives a steady stream of frames in which the transmitter is signaling increment or decrement operations, the receiver would still be able to able to synchronize its count to the transmitter. Furthermore, with proper choice of inversion patterns, the synchronization would be possible when no transmission errors are present in a minimum and deterministic number of frames and the synchronization state machine would require a minimum number of states.

In the example synchronization method of FIG. 11, no more than two received frames with error-free GMP overhead are required in order to determine the transmitted Cn value. Also, only the increment/decrement indication and a preselected portion of the inversion pattern (for example, two count LSBs) need to be examined in order to determine the transmitted increment/decrement status.

Specifically, upon detection of loss of synchronization (step 1102), the GMP overhead of the next received OTN signal frame is examined (step 1104) and the received CRC code is validated (step 1106). If the received CRC code in the GMP overhead of the next received OTN signal frame is valid, the GMP overhead is analyzed for any increment or decrement indication (step 1108). Upon detecting an increment/decrement indication, a hunt state based on the received increment/decrement indication and a preselected portion of the inversion pattern (for example, two LSBs of Cn) is entered (step 1110). The GMP overhead of the next subsequent OTN signal frame is examined (step 1112), the CRC code is validated (step 1114) and the increment/decrement indication is analyzed (step 1116). Based on the increment/decrement status of the increment/decrement indication and the preselected portion of the inversion pattern, the resulting count value information is determined and accepted as the new Cn (step 1120) and synchronization is achieved (step 1122).

If there is no increment/decrement indication in the GMP overhead of the next subsequent OTN signal frame, the received Cn is accepted as the new Cn (step 1124) and synchronization is achieved (step 1122).

If the CRC codes of the GMP overheads of two consecutive OTN signal frames are not valid, the process loops until such time the CRC codes of the GMP overheads of two consecutive OTN signal frames are valid, as shown in FIG. 11.

Figure 12:
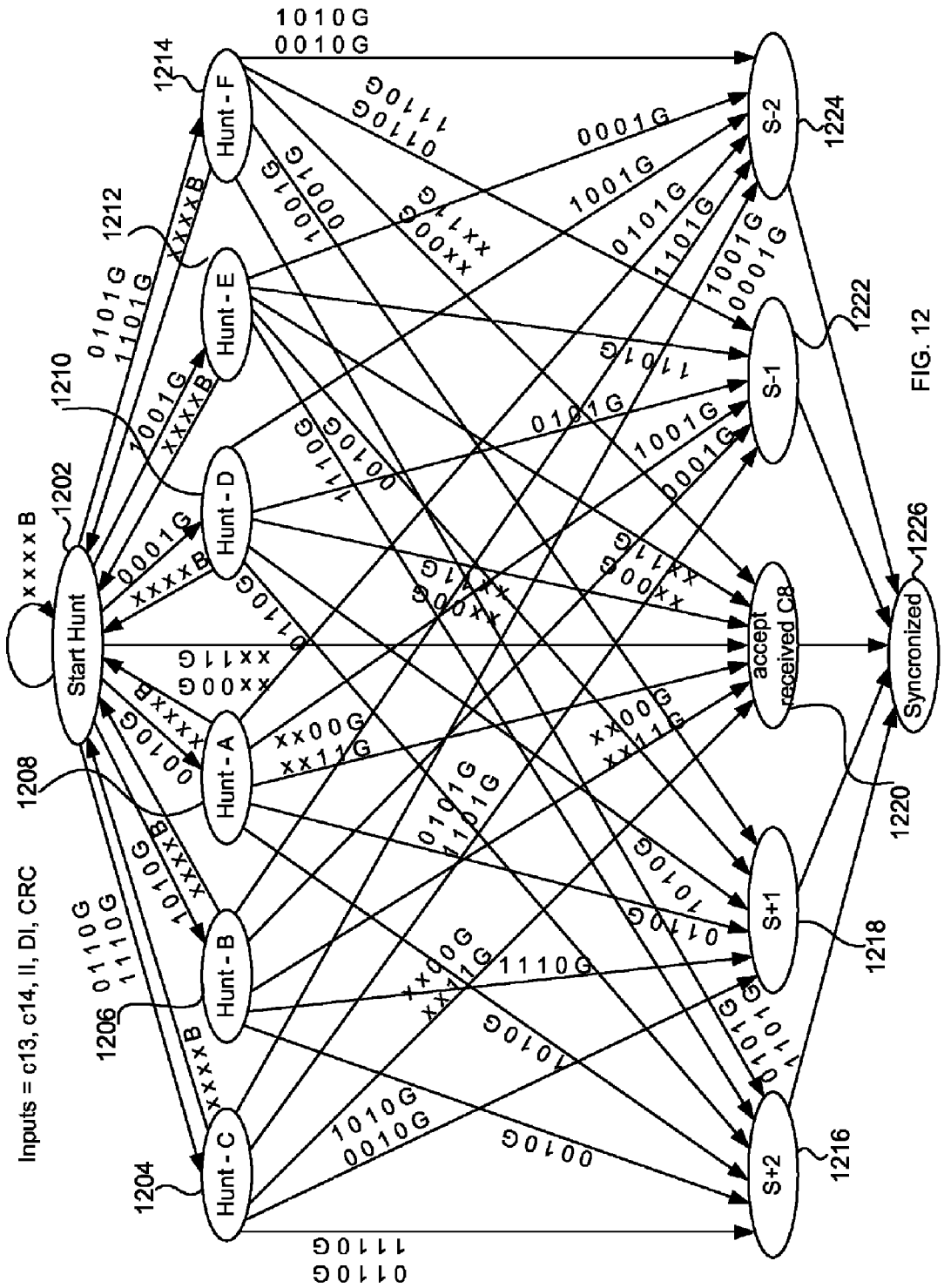
FIG. 12 is a schematic representation of a receiver count value synchronization state machine in accordance with an embodiment.

The synchronization state machine for the example synchronization method of FIG. 11 is illustrated in FIG. 12. Whenever the receiver receives an error-free GMP overhead indicating that no increment or decrement operation is being signaled (II=DI), the receiver can directly accept the received count value. At that point, the receiver is synchronized to the transmitter.

The receiver can detect whether the transmitter is signaling an increment or decrement operation by examining the increment and decrement indicator bits or fields (II and DI). However, the receiver can only determine the magnitude of the increment or decrement (±1 or ±2) through the inversion patterns, which requires synchronization. In an example implementation, the receiver only needs to examine the received II and DI bits, and the two least significant bits of the count (C13 and C14) in the synchronization process. For each given received value in these bits, the transmitter has a limited number of values it can send in the next GMP overhead frame. For example, if the receiver receives an increment indication (II=1), it knows that the base transmitter count value in the next frame will have been incremented by +1 or +2. This increment will affect C13 and/or C14. If the transmitter is indicating an increment or decrement in the next frame, it will be relative to this modified base count value.

A proper choice of the inversion patterns will limit the number of possible combinations of consecutive received C13, C14, II, and DI values that can be received such that the receiver can determine the transmitter's base count value from the second set of these bits as illustrated in FIG. 12. In the "Start Hunt" state 1202, the receiver examines the first set of received C13, C14, II, and DI values. From these values, the synchronization state machine can move to the appropriate "Hunt-x" state 1204, 1206, 1210, 1212 where it examines the C13, C14, II, and DI values received in the next frame. If an increment or decrement was signaled in the first frame, there are $(2^2)(2)=8$ different possible values for these bits, which implies eight "Hunt-x" states. However, with proper choice of inversion patterns, such as those described herein, some of the C13, C14, II, and DI values in the first frame lead to the same "Hunt-x" states. In this illustration two different received C13, C14, II, and DI values lead to each of the "Hunt-C" and "Hunt-F" states. The increment/decrement indication can be determined to be one of increment by 1 (s+1) 1216, increment by two (s+2) 1218, accept received Cn 1220, decrement by 1 (s−1) 1222, and decrement by 2 (s−2) 1224. Upon determination of the correct increment/decrement indication, synchronization 1226 is achieved. The decision logic for determining the increment/decrement indication and operation for recovering the correct Cn value is listed in Table 8.

TABLE 8

| |
| --- |
| S − 1: Count = C1-C14 after inverting C2, C4, C6, C8, C10, C12, & C14; Decrement −1 for next frame |
| S − 2: Count = C1-C14 after inverting C1, C4, C5, C8, C9, C12, C13; Decrement −2 for next frame |
| S + 2: Count = C1-C14 after inverting C2, C3, C6, C7, C10, C11, & C14; Increment +2 for the next frame |
| S + 1: Count = C1-C14 after inverting C1, C3, C5, C7, C9, C11, & C13; Increment +1 for the next frame |

Thus, a proper choice of the inversion patterns minimizes the number of consecutive received frames that need to be examined in order to achieve synchronization, and also minimizes the number of states required for the synchronization state machine, for example, from 8 possible states to 6 as described above.

Figure 13:
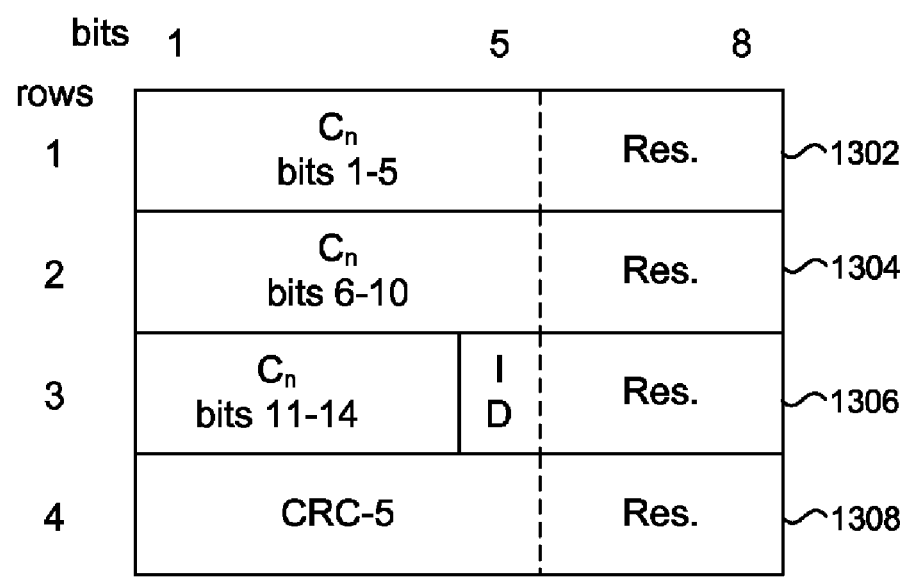
FIG. 13 is an illustration of control overhead encoding in accordance with another embodiment.

In an alternative example embodiment of the method of communicating count value information, four separate bytes may be used (e.g., ODU frame column 16 rows 1-4) and in which only increment and decrement by ±1 is required. As shown in FIG. 13, a first portion of the inversion pattern can be inserted in the JC1 byte 1302 of the GMP overhead of the OTN signal frame. A second portion of the inversion pattern can be inserted in the JC2 byte 1304, and a third portion of the inversion pattern in the JC3 byte 1306 of the GMP overhead of the OTN signal frame. A CRC code can be inserted in the JC4 byte 1308 of the GMP overhead of the OTN signal frame. As illustrated in FIG. 13, this embodiment requires only 20 bits, using 5-bits per GMP OPU overhead byte.

In this example embodiment, the availability of the JC4 byte is used by dividing the count value information across the four rows. The unused bits in each byte may be reserved and made available for other applications. Since there are no more than 5-bits of overhead information per row, a 5-bit CRC-5 code is capable of detecting any burst error that corrupts one of these bytes. As with the previously described encoding method, Cn is comprised of a 14-bit binary number. When the magnitude of the increment and decrement is restricted to ±1, it is possible to combine the Increment Indicator and Decrement Indicator bits into a single Increment/Decrement (ID) bit.

Merging the II and DI bits into the ID requires a different choice of inversion pattern encoding. A suitable inversion pattern encoding is shown in Table 9, which allows the receiver to distinguish between increments and decrements during the synchronization process. To maintain a workable inversion pattern that allows the receiver to obtain synchronization; the increment inversion pattern must invert the LSB (C14 in the example shown here), but not the next-to-LSB (C13 in the example shown here), and the decrement inversion pattern must invert both the two LSBs (C13 and C14 in the example shown here). Furthermore, the inversion patterns must have a Hamming distance of at least 2 in each overhead byte (i.e., in each 5-bit segment of the Cn field) relative to each other.

Figure 14:
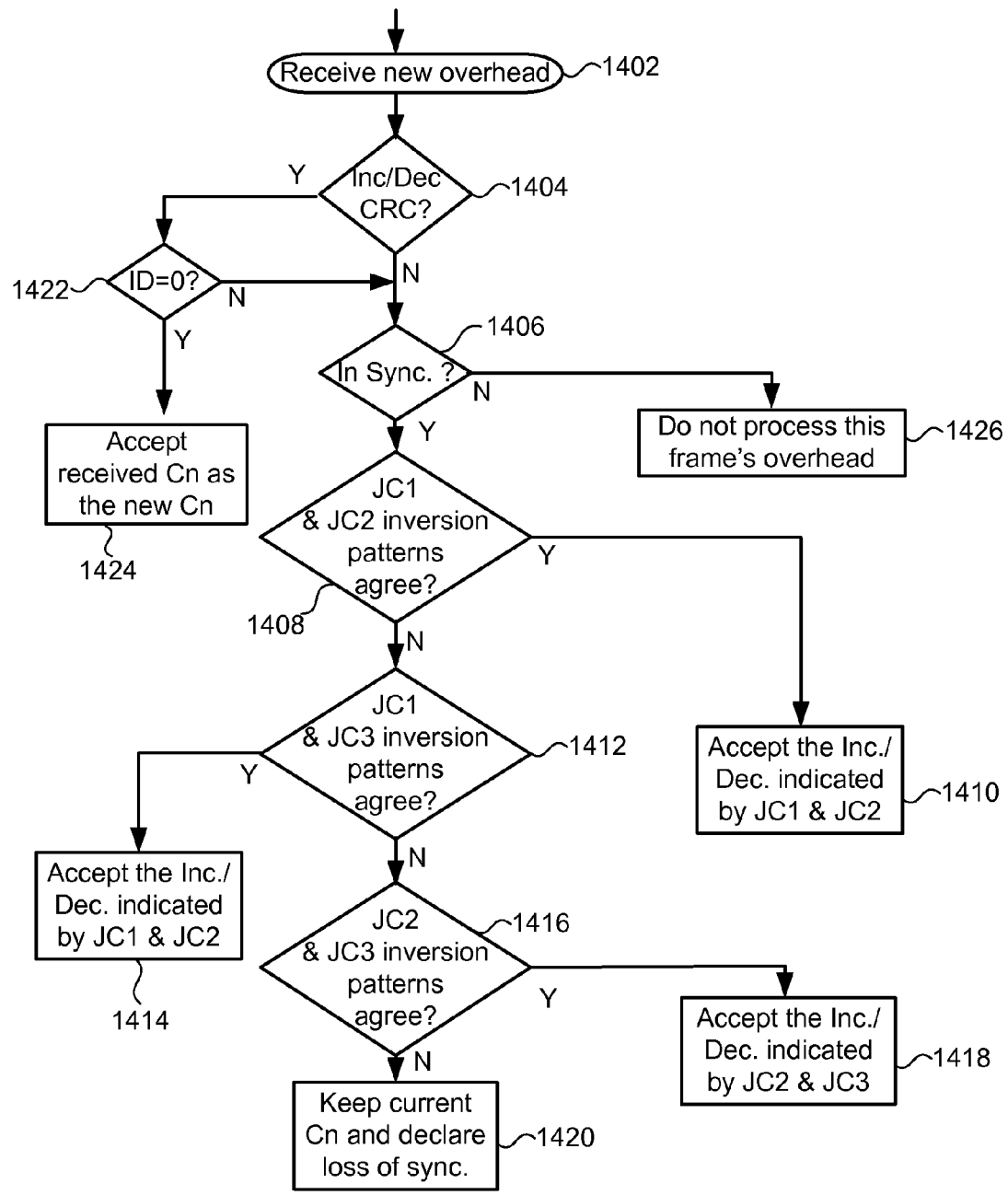
FIG. 14 is a flow diagram illustration a decoding method for channels with burst errors in accordance with the embodiment of FIG. 13.

An example receiver implementation for this encoding method is illustrated in FIG. 14. Since the Cn field is distributed among three overhead bytes, a robust receiver can be implemented by choosing the increment/decrement decision indicated by any pair of the bytes containing the Cn or Cn plus ID fields. As with the implementation for the previously described embodiments, it is possible to use the CRC-5 to confirm this decision. However, since errors are assumed to be limited to affecting a single byte, using the CRC for this confirmation would be unnecessary. The CRC is primarily used during synchronization to an initial or completely new Cn value.

increment/decrement indication indicated by the JC1 byte and the JC3 byte is accepted (step 1414).

If the received inversion pattern in the JC1 byte and the JC3 byte are not in agreement, the received inversion pattern in the JC2 byte and the JC3 byte (the second and third portions of the inversion pattern, respectively) is analyzed to determine if they are in agreement (step 1416). If the received inversion pattern in the JC2 byte and the JC3 byte are in agreement, the increment/decrement indication indicated by the JC2 byte and the JC3 byte is accepted (step 1418). As noted earlier, the logic flow can be implemented in a parallel manner as well.

If the received inversion pattern in any two of the JC1 byte, the JC2 byte, and the JC3 byte are not in agreement, the receiver retains the current count value information and declares a loss of synchronization (step 1420).

Upon determination that the CRC code does not correspond to an increment/decrement indication and if the increment/decrement indication bit is not "inverted" (step 1422), the receiver accepts the received count value information as the new Cn (step 1424).

TABLE 9

| JC1 bits | | | | | JC2 bits | | | | | JC3 bits | | | | | |
|---|---|---|---|---|---|---|---|---|---|---|---|---|---|---|---|
| C1 | C2 | C3 | C4 | C5 | C6 | C7 | C8 | C9 | C10 | C11 | C12 | C13 | C14 | ID | Change |
| 0 | 0 | 0 | 0 | 0 | 0 | 0 | 0 | 0 | 0 | 0 | 0 | 0 | 0 | 0 | 0 or >±1 |
| 0 | 1 | 0 | 1 | 0 | 1 | 0 | 1 | 0 | 1 | 0 | 1 | 0 | 1 | 1 | +1 |
| 1 | 1 | 0 | 0 | 1 | 1 | 0 | 0 | 1 | 1 | 0 | 0 | 1 | 1 | 1 | −1 |

Using a single increment/decrement indication bit does not allow signaling a completely new Cn value. Thus, a different CRC polynomial is used to indicate a completely new Cn value. The receiver would check the received CRC for both polynomials to determine whether the received value is an indication of the same (unchanged or an increment of ±1) Cn that it expected or an indication of a completely new one. A drawback to this approach is that a burst error could cause the received overhead to mimic a new Cn by causing the received information to be divisible by the new count CRC polynomial.

Optimum CRC-5 polynomials are $x^5+x^4+1$, $x^5+x^2+1$, or $x^5+x+1$. Each of these polynomials can be implemented in parallel logic equations with ≦9 terms/bit.

As illustrated in the flow diagram of FIG. 14, upon receipt of the GMP overhead of the OTN signal frame (step 1402), the CRC is checked to determine if it corresponds to a increment/decrement indication or a new count value (step 1404). Upon determination that it is not a new count value indication, if the receiver's expected count value is synchronized to the transmitter (step 1406), the received inversion pattern in the JC1 byte and the JC2 byte (the first and second portions of the inversion pattern, respectively) is analyzed to determine if they are in agreement (step 1408). If the received inversion pattern in the JC1 byte and the JC2 byte are in agreement, the increment/decrement indication indicated by the JC1 byte and the JC2 byte is accepted (step 1410).

If the received inversion pattern in the JC1 byte and the JC2 byte are not in agreement, the received inversion pattern in the JC1 byte and the JC3 byte (the first and third portions of the inversion pattern, respectively) is analyzed to determine if they are in agreement (step 1412). If the received inversion pattern in the JC1 byte and the JC3 byte are in agreement, the However, if the receiver's expected count value is not synchronized to the transmitter (step 1406), the receiver does not process the GMP overhead of the received OTN signal frame.

Figure 15:
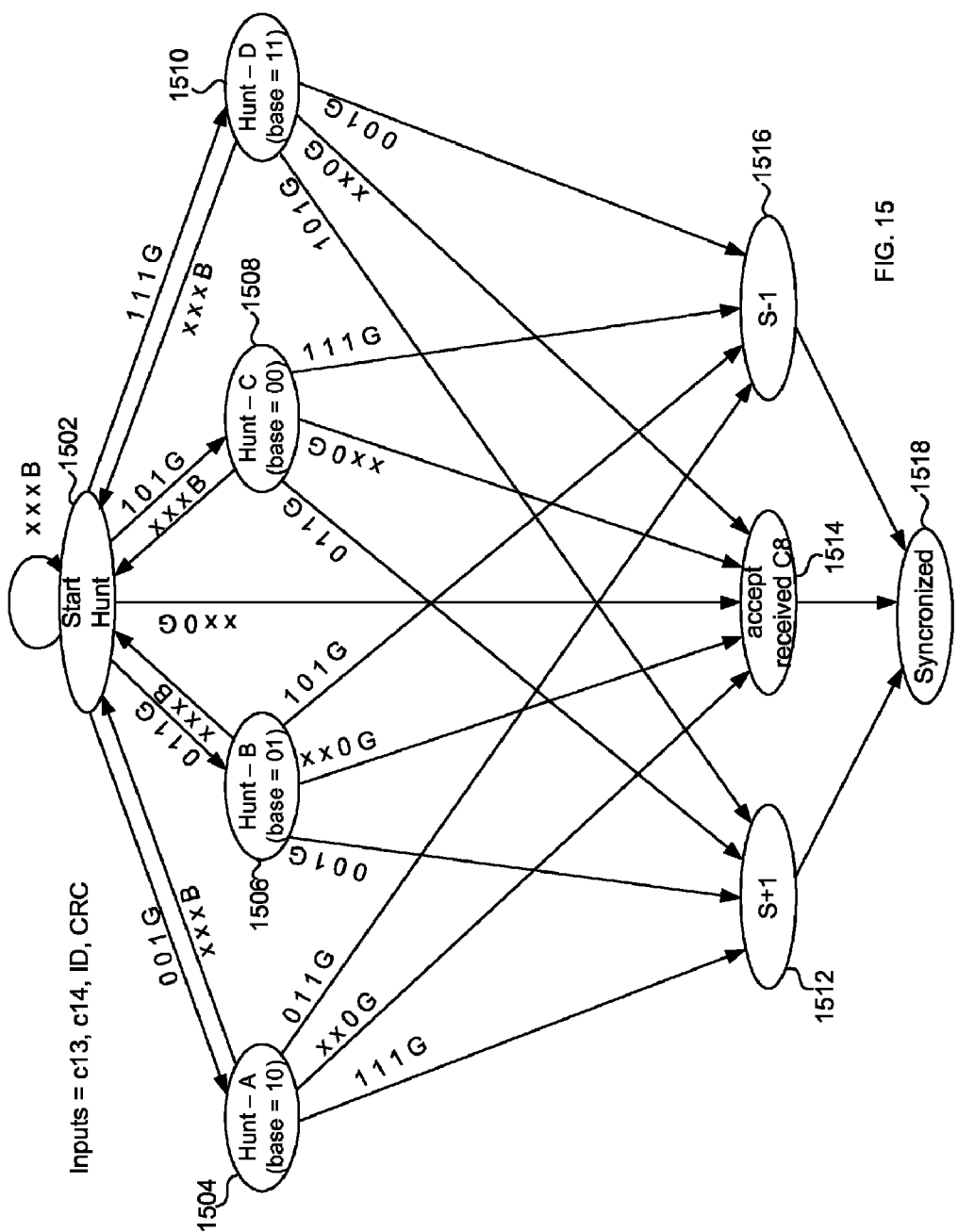
FIG. 15 is a schematic representation of a receiver count value synchronization state machine in accordance with the embodiment of FIG. 13; and, FIG. 16 is a schematic representation of a system for implementing the method of controlling count value information in a GMP as described herein.

The receiver synchronization state machine for the encoding method of FIG. 14 is illustrated in FIG. 15. The synchronization flow is similar to the method illustrated in FIG. 11. Due to the specific choice of the increment and decrement inversion patterns listed in Table 9, the receiver only needs to examine the two Cn LSBs (C13 and C14 in the example shown here), the ID bit, and whether the CRC is valid.

The receiver can determine a unique next state based on the values of these bits in a first frame. The values of these bits in the next frame then allow the receiver to unambiguously determine the correct interpretation of the increment decrement status of that overhead, and consequently the correct interpretation of the transmitter's current base Cn value.

Entering the start hunt state 1502, the increment and decrement inversion pattern encoding choice minimizes the number of states in the state machine, with only four states 1504, 1506, 1508, 1510, required for examining the second received overhead values. As with the synchronization state machine of FIG. 12, the receiver immediately accepts the Cn value when the CRC is good and ID=0 (i.e., the transmitter is indicating that no increment or decrement is being signaled and hence no inversion patterns are present).

Based on the hunt state, the increment/decrement indication can be determined to be one of increment by 1 (s+1) 1512, accept received Cn 1514, and decrement by 1 (s−1) 1516. Upon determination of the correct increment/decrement indication, synchronization 1518 is achieved. The decision logic and operation for recovering the correct Cn value for determining the increment/decrement indication is listed in Table 10.

TABLE 10

Figure 16:
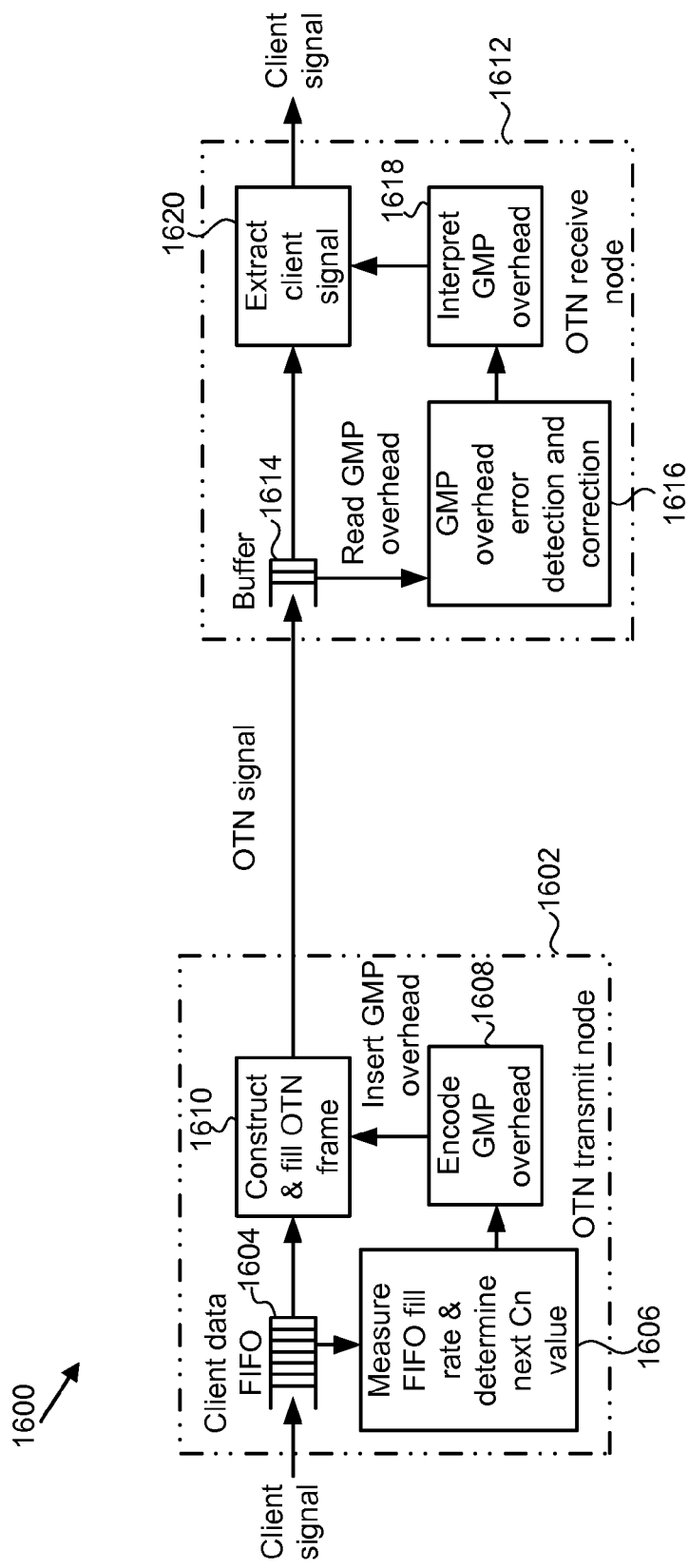

S + 1:
Count = C1-C14 after inverting C2, C4, C6, C8, C10, C12, & C14;
Increment +1 for next frame
S − 1:
Count = C1-C14 after inverting C1, C2, C5, C6, C9, C10, C13 & C14;
Decrement −1 for the next frame FIG. 16 is a schematic representation of a system 1600 for implementing the method of controlling count value information in a GMP as described herein. The OTN transmit node 1602 comprises a FIFO buffer 1604, a count value determination logic 1606, a GMP encoder 1608, and a OTN frame construction logic 1610. The count value determination logic 1604 measures the rate of the incoming client data signal and the FIFO fill level to determine the number of client bytes Cn that must be transmitted during the next OTN frame. The GMP encoder 1608 selects an inversion pattern corresponding to Cn and calculates a CRC code associated with the selected inversion pattern. The OTN frame construction logic 1610 assembles ODU specific overhead, the OPU overhead including the encoded GMP overhead, the OPU payload, and any other information to be transmitted into an OTN signal frame.

The OTN receive node 1612 comprises a receive buffer 1614, a GMP decoder 1616, a count value interpretation logic 1618 and a signal extractor 1620. The receive buffer 1614 receives the OTN signal frame with the encoded GMP overhead. The GMP decoder 1616 extracts the GMP overhead bytes from the receive buffer 1614 and performs any required error detection and correction as described herein. The count value interpretation logic 1618 interprets the encoded GMP overhead to ascertain the Cn value sent by the transmit node 1602. The signal extractor 1620 uses the ascertained Cn value to extract the client data from the received OTN signal frame.

In summary, the GMP overhead encoding method described herein allows for different receiver implementations with a scalable range of robustness/complexity tradeoffs. The receiver cost/complexity can be matched to the performance requirements of the transmission channel or application. The GMP overhead encoding method also provides deterministic and rapid synchronization to an initial count value with a minimum number of states in the receiver synchronization state machine. Synchronization is used whenever the receiver must acquire count value synchronization after system initialization or recovery from a fault condition such as a loss of signal. Synchronization is achieved after receiving no more than 2 consecutive error-free GMP overhead blocks.

The GMP overhead encoding method described herein can be properly interpreted in the presence of all burst errors of less than 30,000 bits. This is achieved by dividing the information among overhead bytes located in different OTN frame rows, which makes the individual bytes over 30,000 bits apart. Furthermore, with suitable receiver implementation, correct count value information interpretation is guaranteed in the presence of such burst errors for all cases except for initialization or fault recovery where the receiver is not synchronized to the transmitter.

The GMP overhead encoding method described herein allows the receiver to identify an error-free received GMP count value to establish or confirm the receiver's synchronization to the transmitter on a link subject to burst errors of up to 30,000 bits (i.e., when the received GMP overhead is good, the receiver can know that with certainty.)

The GMP overhead encoding method uses a minimum length error detection code, such as a CRC. The error check code can be chosen for minimum check circuit complexity and latency. The CRC generator polynomial can be chosen to allow a parallel logic implementation with minimum logic depth for any individual bit and, within this constraint on each individual bit, a minimum total number of logic terms for all bits is used, resulting in minimum latency and complexity.

The GMP overhead encoding method described herein allows signaling count value increment and decrement with magnitude of both ±1 and ±2. Typically, all count value variations during normal operation (i.e., not during initialization or fault recovery) are simple increment and decrement. While the magnitude is typically ±1, a change with magnitude ±2 is required for certain applications. Such variations can be readily communicated using the GMP overhead encoding method described herein.

Increment and decrement and their respective magnitudes are communicated by inverting unique patterns of the count bits. The inversion patterns for communicating increment and decrement can be chosen to maximize the overall Hamming distance of the patterns. The inversion patterns for signaling increment and decrement chosen to minimize the complexity and synchronization time of the receiver count synchronization state machine. Using separate increment and decrement indicator bits to signal an increment, decrement, or a non-change or new value allows the receiver to accept the received count value immediately for synchronization.

The GMP overhead encoding method described herein optimizes the error protection for typical cases (±1, ±2, and no-change) in order to minimize the number of error protection overhead bits.

The GMP overhead encoding method described herein is significant in view of the anticipated extensive deployment of GMP. The GMP overhead encoding method described herein provides superior performance in terms of robustness, compactness (bit efficiency), and flexibility for optimizing the receiver for the transmission channel.

In the preceding description, for purposes of explanation, numerous details are set forth in order to provide a thorough understanding of the embodiments of the invention. However, it will be apparent to one skilled in the art that these specific details are not required in order to practice the invention. In other instances, well-known electrical structures and circuits are shown in block diagram form in order not to obscure the invention. For example, specific details are not provided as to whether the embodiments of the invention described herein are implemented as a software routine, hardware circuit, firmware, or a combination thereof.

Embodiments of the invention can be represented as a software product stored in a machine-readable medium (also referred to as a computer-readable medium, a processor-readable medium, or a computer usable medium having a computer-readable program code embodied therein). The machine-readable medium can be any suitable tangible medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention can also be stored on the machine-readable medium. Software running from the machine-readable medium can interface with circuitry to perform the described tasks.

The above-described embodiments of the invention are intended to be examples only. Alterations, modifications and variations can be effected to the particular embodiments by those of skill in the art without departing from the scope of the invention, which is defined solely by the claims appended hereto.

What is claimed is:

1. A method of communicating count value information in an Optical Transport Network (OTN) signal frame, the method comprising:
   determining a count value indicating a number of payload bytes to be sent in a next OTN signal frame;
   determining that a change in the count value ($\Delta$) with respect to a current count value is within a predetermined range;
   selecting an inversion pattern indicating the change in the count value;
   determining a cyclic redundancy check (CRC) code associated with the inversion pattern;
   inserting a first portion of the inversion pattern in a JC1 byte of a Generic Mapping Procedure (GMP) overhead of the OTN signal frame;
   inserting a second portion of the inversion pattern in a JC2 byte of the GMP overhead of the OTN signal frame;
   inserting a third portion of the inversion pattern in a JC3 byte of the GMP overhead of the OTN signal frame;
   inserting the CRC code in a JC4 byte of the GMP overhead of the OTN signal frame; and,
   transmitting the OTN signal frame to communicate the count value information.

2. The method of claim 1, wherein the inversion pattern includes an increment/decrement indication.

3. The method of claim 2, wherein the inversion pattern is applied to bits indicating the count value and the CRC code is associated with the count value modified by the inversion pattern.

4. The method of claim 2, wherein the increment/decrement indication includes a single bit increment/decrement indicator.

5. The method of claim 4, wherein the predetermined range is defined by $-1 \leq \Delta \leq +1$.

6. The method of claim 4, wherein the single bit increment/decrement indicator is in the JC3 byte of the GMP overhead of the OTN signal frame.

7. The method of claim 6, further comprising:
   determining the count value information by
   determining that a receiver of the OTN signal frame is synchronized with a transmitter of the OTN signal frame;
   analyzing the inversion status of the first portion of the inversion pattern in the JC1 byte of the GMP overhead of the OTN signal frame to validate the first portion of the inversion pattern;
   analyzing the inversion status of the second portion of the inversion pattern in the JC2 byte of the GMP overhead of the OTN signal frame to validate the second portion of the inversion pattern;
   analyzing the inversion status of the third portion of the inversion pattern in the JC3 byte of the GMP overhead of the OTN signal frame to validate the third portion of the inversion pattern; and,
   comparing any two of the validated first portion of the inversion pattern, the validated second portion of the inversion pattern, and the validated third portion of the inversion pattern to determine the change in the count value indicated by the inversion pattern in the GMP overhead of the OTN signal frame.

8. The method of claim 7, further comprising:
   upon determination that a synchronization between a transmitted GMP overhead of the OTN signal frame and a received GMP overhead of the OTN signal frame has been lost:
   analyzing a subsequently received GMP overhead of the OTN signal to validate the CRC code;
   entering a hunt state based on the increment/decrement indication and a preselected portion of the inversion pattern of the subsequently received GMP overhead of the OTN signal frame;
   determining an increment/decrement status based on the hunt state; and
   synchronizing the transmitted GMP overhead of the OTN signal frame and the received GMP overhead of the OTN signal frame.

9. The method of claim 8, further comprising:
   upon determination that the increment/decrement indication of the received GMP overhead of the OTN signal frame indicates a no change in the count value and upon determination that the CRC code is valid,
   synchronizing the transmitted GMP overhead of the OTN signal frame and the received overhead of the OTN signal frame without further processing of the received GMP overhead of the OTN signal frame.

10. The method of claim 2, further comprising:
    determining the count value information by
    analyzing the increment/decrement indication in the inversion pattern of the GMP overhead of the OTN signal frame to determine that the inversion pattern is valid; and,
    comparing an inversion status of a preselected portion of the inversion pattern to determine the change in the count value indicated by the inversion pattern in the GMP overhead of the OTN signal frame.

11. The method of claim 10, further comprising:
    validating the cyclic redundancy check (CRC) code in the GMP overhead of the OTN signal frame.

12. The method of claim 11, wherein the increment/decrement indication includes a single bit increment/decrement indicator and the CRC code is used to correct single bit errors in the GMP overhead of the OTN signal frame prior to comparing the inversion status.

13. The method of claim 1, further comprising:
    upon determining that the change in the count value with respect to the current count value is not within the predetermined range, indicating the number of payload bytes to be sent in the next OTN signal frame in the GMP overhead.

14. A system for controlling count value information in an Optical Transport Network (OTN) signal frame, the system comprising:
    an OTN transmit node including a FIFO buffer buffering incoming client data signal, a count value determination logic measuring a rate of the incoming client data signal and a FIFO fill level to determine the number of client bytes Cn that must be transmitted during a next OTN frame, a GMP encoder selecting an inversion pattern corresponding to the Cn and calculating a CRC code associated with the selected inversion pattern, and a OTN frame construction logic assembling the OTN signal frame including an encoded GMP overhead containing the selected inversion pattern and the associated CRC code by inserting a first portion, a second portion, and a third portion of the selected inversion pattern in a JC1 byte, JC2 byte, and a JC3 byte, respectively of the GMP overhead of the OTN signal frame and by inserting the CRC code in a JC4 byte of the GMP overhead of the OTN signal frame;

an OTN receive node including a receive buffer receiving the OTN signal frame with the encoded GMP overhead, a GMP decoder extracting the selected inversion pattern and the associated CRC code from the encoded GMP overhead, a count value interpretation logic interpreting the selected inversion pattern and the associated CRC code to ascertain the Cn sent by the transmit node, and a signal extractor extracting the client data signal from the received OTN signal frame using the ascertained Cn.

15. The system of claim 14, wherein the client data signal is an Ethernet, video, or a storage area network (SAN) signal.

* * * * *

UNITED STATES PATENT AND TRADEMARK OFFICE
CERTIFICATE OF CORRECTION

PATENT NO. : 8,340,134 B1
APPLICATION NO. : 12/612397
DATED : December 25, 2012
INVENTOR(S) : Steven Scott Gorshe It is certified that error appears in the above-identified patent and that said Letters Patent is hereby corrected as shown below:

In the Specifications:

In Table 6, at column 17, lines 58-60,

| "2 | Valid correct pattern | Invalid pattern corresponds to the JC1 pattern | CRC indicated by JC1" | Accept action | should read

| --2 | Valid correct pattern | Invalid pattern | CRC corresponds to the JC1 pattern-- | Accept action indicated by JC1 |

Signed and Sealed this
Fourteenth Day of May, 2013

Teresa Stanek Rea
*Acting Director of the United States Patent and Trademark Office*